(12) United States Patent (10) Patent No.: US 12,573,152 B2

Doberenz (45) Date of Patent: Mar. 10, 2026

(54) OVERLAY TECHNOLOGY FOR ENHANCING CONNECTIVITY AND REALISM IN INTERACTING SIMULATIONS

(71) Applicant: Maximilian Doberenz, Zwickau (DE)

(72) Inventor: Maximilian Doberenz, Zwickau (DE)

( * ) Notice: Subject to any disclaimer, the term of this patent is extended or adjusted under 35 U.S.C. 154(b) by 0 days.

(21) Appl. No.: 18/826,423

(22) Filed: Sep. 6, 2024

(65) Prior Publication Data

US 2025/0086897 A1 Mar. 13, 2025

(30) Foreign Application Priority Data

Sep. 7, 2023 (EP) ..................................... 23196091

(51) Int. Cl.
| | |
|---|---|
| *G06F 1/16* | (2006.01) |
| *G06F 3/01* | (2006.01) |
| *G06T 19/00* | (2011.01) |
| *G09B 9/30* | (2006.01) |
| *G09G 3/00* | (2006.01) |

(52) U.S. Cl.
CPC .............. *G06T 19/00* (2013.01); *G06F 1/163* (2013.01); *G06F 3/011* (2013.01); *G06F 3/017* (2013.01); *G09B 9/302* (2013.01); *G09B 9/307* (2013.01); *G09G 3/001* (2013.01); *G06T 2200/24* (2013.01); *G06T 2210/62* (2013.01); *G06T 2219/024* (2013.01); *G09G 2340/12* (2013.01); *G09G 2354/00* (2013.01); *G09G 2370/022* (2013.01)

(58) Field of Classification Search
CPC . G06T 19/00; G06T 2200/24; G06T 2210/62; G06T 2219/024; G06F 1/163; G06F 3/011; G06F 3/017; G09B 9/302; G09B 9/307; G09G 3/001; G09G 2340/12; G09G 2354/00; G09G 2370/022; A63F 13/211; A63F 13/212; A63F 13/35; A63F 13/428; A63F 13/5255; A63F 13/213; A63F 13/25
See application file for complete search history.

(56) References Cited

U.S. PATENT DOCUMENTS

| | | | | |
|---|---|---|---|---|
| 10,529,248 | B2 * | 1/2020 | Chavez ................. | G09B 9/302 |
| 10,884,525 | B1 * | 1/2021 | Vonsik .................... | G06F 3/011 |
| 11,200,742 | B1 * | 12/2021 | Post ...................... | G06T 19/003 |
| 11,630,633 | B1 * | 4/2023 | MacDougall ........... | G06F 3/017 |
| | | | | 715/204 |

(Continued)

FOREIGN PATENT DOCUMENTS

| | | | | |
|---|---|---|---|---|
| WO | 2016053906 A1 | 4/2016 | | |
| WO | WO-2019143572 A1 * | 7/2019 | ......... | G02B 27/0093 |

OTHER PUBLICATIONS

Extended European Search Report for European Application No. 23196091.5 dated Feb. 15, 2024.

*Primary Examiner* — Ibrahim A Khan

(74) *Attorney, Agent, or Firm* — Renner, Otto, Boisselle & Sklar, LLP

(57) ABSTRACT

Method providing interactive simulation comprising a first computer displaying first simulation interacting with a first user, the first computer is connected to a first head mounted display, HMD, and a first interactive control, a second computer displaying a second simulation interacting with a second user, the second computer is connected to a second HMD and a second interactive control, wherein the first computer is connected to the second computer via a network.

9 Claims, 24 Drawing Sheets

(56)                    References Cited

U.S. PATENT DOCUMENTS

| | | | | | |
|---|---|---|---|---|---|
| 12,099,695 | B1 * | 9/2024 | Smith | ..................... | G06T 19/00 |
| 12,265,664 | B2 * | 4/2025 | Evangelidis | ............ | G06F 3/017 |
| 2018/0005429 | A1 * | 1/2018 | Osman | .................... | A63F 13/56 |
| 2018/0090029 | A1 * | 3/2018 | Fisher | .................... | G09B 23/28 |
| 2019/0188895 | A1 * | 6/2019 | Miller, IV | .............. | G06V 40/20 |
| 2021/0132380 | A1 * | 5/2021 | Wieczorek | .......... | A63F 13/5255 |
| 2021/0312887 | A1 * | 10/2021 | Griswold | .............. | G06T 19/006 |
| 2022/0197585 | A1 * | 6/2022 | Nagar | .................. | G06F 3/1454 |
| 2025/0077161 | A1 * | 3/2025 | Kaneko | ................ | A61B 1/0655 |

* cited by examiner

Local Simulation 3

OVERLAY TECHNOLOGY FOR ENHANCING CONNECTIVITY AND REALISM IN INTERACTING SIMULATIONS

CROSS REFERENCE TO RELATED APPLICATION

This application claims priority under 35 USC § 119(a) to European Patent Application No. 23196091.5 filed 7 Sep. 2023, which is hereby incorporated herein by reference in its entirety.

FIELD OF THE INVENTION

The invention relates to a device and method to provide interactive simulation with at least a first and a second users, comprising a first computer running first simulation interacting with the first user, the first computer is connected to a first headset and a first control, a second computer running a second simulation interacting with the second user, the second computer is connected to a second headset and a second control, wherein the first computer is connected to the second computer via a network.

BACKGROUND OF INVENTION

The invention relates to a simulation with one or multiple participants. One example could be a flight simulator in which two pilots are flying together sitting at different locations. In order to give the pilots a feeling of cooperation, the movements/inputs of the pilots must flow into each other's simulation. For example, the movement of the second pilot is shown in the first pilots overlay and vice versa. Depending from the simulation, the effect might be transferred to the simulation via the overlay in which the movement is seen or via data-sync between the simulations of each user.

For example, the pilot must perceive in his simulation how the co-pilot operates certain controls for example /switches/buttons/knobs/lever.

The problem is that most simulators where multiple users can interact are not configured to provide the behaviours or even the movements of the different users. The simulators known only provide remote interaction by indicating the changes of the controls. For example, if a co-pilot changes the thrust of an engine only the movement of the thrust lever is indicated but not the hand moving the thrust lever.

The problem to be solved is how to integrate into existing simulators any interaction of the users, for example providing the users an impression that a person is sitting next to each other.

In this context a further problem to be solved is to introduce in an existing simulation software a functionality that allows an interaction in which the users have the feeling that a person is sitting spatially next to them, although this person is e.g. remotely in another place, without amending the code of the simulation software or even having access to the code of the simulation software.

The aim of the invention is to use any VR-Simulation with any VR-Headset (SteamVR/computer capability needed) to control the Simulation by bare hands (without controllers) while implementing an interactive media player to run trainings and combine them in a team environment and multi simulation scenarios. With those criteria, the explanation will be done with a flight simulation example.

SUMMARY OF INVENTION

The problem is solved by the features of the claims.

The invention provides also a tool to incorporate learning and guidance information which are not a standard part of the simulator. This provides a reproducible lesson or course plan for content provider which do not have access to the simulation used. The approach avoids an interfering with any simulator certification. This reduces costs towards certification and enables companies to quickly adapt to changing environments and enable the use "pre-certified" (already certified) solution. For example, bringing in a new aircraft type and still using the same overlay setup without having the CBT—computer-based trainings—certified for the simulation provided by the manufacturer.

The invention is not limited to flight simulators. However, in the following most of the examples refer to flight simulators. The invention tracks on the user level the motions of each user, and describes this motion so that it can be transferred to the other user to provide the experience to each user. It also contains the setup needed for joining a local simulation.

The local simulation is a confined area where all users can interact with the simulation. All users in one simulation are directly affected by the inputs of the other users and external inputs. Furthermore, the invention is capable of having users use different simulations but the outcome of every user's input is the same for all simulations, since the simulations are synchronized. Nevertheless, in case of X-Plane a single simulation can host multiple users.

On a global scenario level every simulation can interact with each other. This cascades down to the local simulation and eventually to the user. However, the user level is less important to the global simulation as only the output of each simulation is received. In case of an aircraft simulation the aircraft might be flying with gear down—for the global scenario it is unimportant who, how, and what make the gear come down, it is only important that it is "down" in this context.

To limit the need to have access to the code of the simulation software the overlay relays is used to display user interaction. For the exchange of control changes an API or communication-interface of the simulation program is used, acting as an extended "keyboard". By using the official API, the certification is not interfered when using the overlay. This allows the invention to act as a translucent/clear overlay or a space for creation of a visible environment with the simulation data generated externally. If the data is provided internally, the whole program can be the simulation itself, if needed. It means that if the simulation is only supplying data and no visual output, the overlay can provide a visible representation of that data. The overlay provider creates for example the cockpit, gauges and visual environment for the user experience.

In a preferred embodiment a Standalone application is rendering hands and media content. There is a variety of reasons for that:

If the simulation only provides data, the application can render the visual part as well, The application, running on each user's device, is the same for all simulations, except the API-connection to the simulation, Cross platform scenarios are possible, Headset and hand tracking implementation is not interfering with the simulation.

A decision about the language and platform of the application is made based on following criteria:

Access to SDKs

Rendering options and graphic card interaction

Connectivity to the platform

Data and resource management

Currently the biggest gaming platform is Microsoft Windows, therefore, the language has to be compatible. Considering a windowed application, the implementation of drivers towards the graphic card and especially the VR-headset, the decision is to go for a gaming or simulation engine/development environment. The two major environments are:

Unreal engine

Unity engine

For the overlay the engine used is Unity. The Unity engine provides a graphic interface for game development, hence the rendering pipeline, to all objects (hands, Interactables, external media) which are not part of the simulator (X-Plane, Microsoft Flight Simulator etc.). Additionally, the SDKs from Microsoft Flight Simulator, Oculus (Meta-VR-HMD) and LeapMotion (UltraLeap) have a Unity-support. It can directly interact with simulators/APIs or hardware drivers. Unity also uses the OpenVR and SteamVR SDK almost natively.

Unity is based on "mono" an open developer project that is very similar and compatible to C#. Therefore, most C#-libraries and codes work as well within the Unity project. Connections to C++ and C are not directly possible but are implemented and explained in a later chapter. Unity can also access low level SDKs and direct APIs/SDKs from third parties. Low level SDKs deal with internal drivers and direct SDKs with accessing specific hardware.

The application shall preferably render the hands of the user and media and additional content provided via a media player/presentation and assistive objects. This includes a team mate and instructor sitting in the same session of the simulation. Therefore, multiple criteria are defined:

Rendered hands shall reflect the hand movement and gestures of the users

Hands shall not irritate the user experience

Hand movements and gestures shall interact with defined inputs of the simulation No rendering of hands when they reach beyond a "wall" in the simulation Media content shall be interactive and reactive to the simulation and user inputs Simulation data shall be available to other simulations (also of different platforms) in a scenario The SteamVR in general is the driver of almost any HMD (Head mounted device) used if the Game/Simulator is provided by Steam (Valve). Other drivers could be Oculus (Meta), generic such as used in MATLAB or OpenVR (SteamVR is a derivate of it). As SteamVR also provides Unity-support (SDK) the Unity game engine (therefore the OpenVR-driver within) can access the hardware/driver process (shader areas on the graphics card etc.) used when the driver renders a game. The idea, as described later, is to use the existing instance of SteamVR to render the overlay on top (during overlay initialization the Simulator's driver process remains the main (and only) instance using VR for that matter) of the simulation.

In a preferred embodiment the whole program is created in modules that interact with each other.

Necessary dependents are set within the specific scene. All other modules are looking for their dependencies during start of the program (application/overlay).

The local simulation only limits the numbers of users. The overlay is scalable. This makes it very versatile by either creation of a single user experience or a complex environment with an unlimited number of participants. Stepping outside of the local simulation, where users can directly interact with the environment a similar principle applies to the global scenario. Any Simulation registers itself by the host of the scenario. The communication to and from the scenario uses preferably the same API or the API/communication-port given by an existing scenario platform/management system.

In a possible embodiment the global scenario handles any interaction between two local simulations. This has a couple of advantages:

1. The local simulations interacting in the scenario do not have to be of the same type.

2. Behaviors of the local simulations are computed externally.

The global simulation provides a framework for communications. A global scenario for example can consist of two or more crews (2 or more multi-pilot aircrafts with 2 pilots (and instructor)) and an ATC (Air Traffic Control) unit and other participants. One crew may utilize X-Plane the other crew uses Microsoft Flight Simulator and the ATC-controller uses a Linux based DFS-simulator. The overlay of each aircraft/ATC-control room sends output to the dedicated server, which may or may not be on one of the user's PC/workstation and see only the relevant output of the simulator. There is no need sending the data used in each overlay to distribute it across the network. The output of the Simulations is sent to the global server from the PC/workstation of the crewmember which is defined as the simulation's server. The server for each local simulation-group syncs the users' simulation with each other, as described before. The server ensures that all the users' simulations have the same state and this state is then transmitted to the global scenario-PC/Workstation/system/server of each user.

On the users' side there is one simulation state defined as the current/master state. This is the state (on that server) the global scenario receives and interacts with.

On the global scenario side which is on a server itself the information is gathered and placed accordingly. The global scenario will send required information to the PC/workstation/server of the local simulation. This received data is then distributed to the derivate of the users' simulation from that/their server/master.

To provide a realistic (as much as possible and depending on hardware used) experience for the user the aim for this project is to use bare hands—(without any controller used) for inputs by the user. The user preferably only wears the HMD. This will enhance the experience and trains the muscle memory for flows and procedures as it uses gestures for specific interactions. A switch might be flicked or held/released. A knob might be rotated or rotated and held or needs several rotations in the same direction multiple times. When using those gestures the user also builds an understanding with the system behind.

To detect the gestures or interactions a hand sensor (called LeapMotion controller or tracker) is either attached to the users HMD or placed in defined spots of the user's workspace-setup. There are HMDs (Varjo) which incorporate those sensors in themselves.

Oculus (Meta) HMDs use their own Hand recognition method. This data can be transformed into LeapSpace and therefore gestured as described later.

In the LeapMotion SDK and setup the hands and finger information of the hand is analyzed. The developer can setup the hands and finger recognition in order to interact with Unity (graphical, physical objects). Further More, LeapMotion is capable of gesture recognition. The developer can even define new gestures if needed. Those gestures can be used to in order to activate or interact with interactables, such as switches.

For example, the developer can implement a "salute" or "thumbs up" gesture in order to activate the command for recognizing the seen bypass pin from the push back crew. The user then needs to salute or show thumbs up during training and the overlay translates it to a command for the simulator that the ground crew is recognized and wanders off.

In a possible environment a user using a simulation software has a computer running the local simulation as well as a virtual reality headset (goggles), hand tracking hardware and access to a local simulation, which is connected over the internet directly or over a server to another simulation software running with a similar configuration for another user.

The computer provides the graphical output in relation to the tracked head position within the local simulation. The data is generated either locally on the machine or provided by another computer. It also receives information about other users within their local simulation. The simulation itself provides data synchronization. It depends on setup and simulation used, if user inputs are repeated/copied at the other user's overlay-program or feedback from the simulator synchronization is updating the overlay. Which means the degree can be configured. In general, both input options are possible.

When working as a team each user sees the other users tracked head and hand position. Their "avatar" moves within the experience of the user. The overlay can be configured in two ways of behavior.

1. One Simulation for all users. X-Plane is configured that one PC has the outputs for all users. Each users' PC only provides data inputs for the Simulation and graphical (VR-environment and overlay) outputs based on the one Simulation. User 1 only sees the "avatar" of user 2/3/4/n but no inputs are generated on user 1's PC.

2. All users are using their own Simulation (e.g., user 1 is on X-Plane and user 2 is on Microsoft Flight Simulator). The "avatar" of user 2 would actually action a switch in user 1's Simulation in order to keep inputs synchronous in both Simulations. (This is not recommended unless both spatial dimensions (switch positions) of both simulators (X-Plane and Microsoft Flight Simulator) are identical.) This not the preferred way and quite difficult to achieve unless the cockpits are provided by the same publisher and are preferably exactly the same in dimension.

Either one tracker or multiple hand tracker are tracking the users hand to provide tracking data of the users' hands. The information of all tracked hands are available in a data package (e.g. irrespectively) of the used input device. Tracking devices can send data directly via the computer or via the network access if the tracking devices are connected to the network (WLAN/LAN). With the LeapMotion SDK (up to SDK 4.0.0) used, it is not possible to use multiple hand tracking sensors on one PC (connected via USB) at the same time. Therefore, it is necessary to provide access to multiple sensors. To let Unity gain access to the driver a main sensor (a GameObject from the (altered) SDK) would be defined in the overlay. It is typically attached to the HMD of the user. A real sensor may or may not be attached to the users HMD as well. As long one (only one) sensor in Unity is defined as main the driver functionality is granted. Other sensor data can now be provided to the overlay. This can be prerecorded (part of media presentation/CBTs) or via network access from other users and their PC. If the area is grater as the field of view of the HMD-attached sensor other sensors can be placed in the training area. Those will provide also tracking data to the overlay. To achieve this the so-called "FRAME (S)" of the sensors needs to be sendable (serialized).

Hand tracking provided by the local simulation will be received by the overlay and processed the same way as external sensors, if applicable. There is no need of a physical controller attached to the local machine in order to obtain, display and use external tracking devices.

One aspect of the invention is to be open for all devices, comprising:
Usage of any headset (SteamVR shall provide the drivers)
Usage of any tracking device (LeapMotion/UltraLeap, Meta, etc.)
Usage of any hardware (if performance requirements are met)
Usage of any OS for simulation and global scenario
Usage of any local simulation (shared by multiple users and their inputs)
Usage of any local simulations shared in a global scenario
Usage of any hardware shared in a global scenario.

The video player, or media/content player, delivers external and preferably interactive content to the simulator. The user has to interact with the content and simulator. The content is interactive with the user as well as with the simulator. The interaction is based on progression. As the content progresses the media player awaits inputs from the user to either the media player or the simulator. Simultaneously, the media player monitors the output of the simulator in order to validate simulator and user behavior. The media player has the capability to manipulate the simulator in such way, that all DataRefs are in the appropriate state for the content (progression state) at all times. It is the responsibility of the content provider to ensure all DataRefs needed are defined. The media player provides external content provided by third parties which do not need to be known or included by the time compilation of the overlay engine. This content can be loaded on runtime and is prepared independently from the overlay.

The media player has the capability to enter and display additional GameObjects (components) to the overlay as content supplement to draw attention of the user to certain areas or objects and indications. It can be used to represent flows, work procedures or any other kind of content to the CBT/simulator. Additional Interactables are possible as well. If additional button/knobs/switches are needed by the training content, they are loaded within the CBT/training content package. For example, training instructions are: point at gauge X, the loaded CBT implements a button at that gauge and the software recognizes the point gesture when the user "pushes" the button at the gauge.

The media player has the ability to use prerecorded Frames (LeapMotion) in order to playback those as an "interactive instructor" or crew partner.

The media player has the capability to track user inputs and gives feedback about success or failure towards the required goal. Feedback to a database can evaluate students/users' performance and enhances evidence-based training.

The overlay shows the hands of the user, a media player, hints/instructions as well as the media/video presentation. It is not supposed to show anything regarding the simulation itself unless the Simulator (only) provides state data, e.g., DataRefs or SimVars. Then the overlay can display gauges and the Interactable environment. The overlay shows other users, when they are visible.

The media player can be used when the content creator wants to implement additional features to the simulator (e.g., its input possibilities). Therefore, the media player has a single progression state and would not interact or monitor user inputs but rather being a deployment tool of third party GameObjects into the overlay.

One core aspect of the invention is that on the computer of each user an overlay is displayed on top of the graphical output of the local simulation that is generated. Overlay means that the user interaction is graphically laid over the simulation representation. For example, the hand of the user is displayed over the graphic information of the simulation. Which means that both software applications have access to the video memory at the same time. The overlay space has to be feed by the data of the simulation regarding objects/ structures and other users to inhibit rendering of overlay content not applicable in every produced frame.

Further, to enable this approach a communication between overlay and local simulation is necessary. This can be done by:

1. Direct access via an API of the simulation by the overlay program (C# or mono access required) or 2. Startup of an external program or service (communication helper) to communicate with the simulation.

The second approach is used when the API uses a language not accessible within the overlay (e.g., managed—C# vs. unmanaged code—C++). The overlay and the communication helper can communicate via multiple means. Examples are via a pipe connection or with network communication protocols.

or

3. Access via network protocols.

In a preferred embodiment all communications between overlay and local simulation are provides via a communication element within the overlay engine. If a request or command is needed by any element it sends that to the communication element. The request is translated to the simulator specific requirements and forwarded. Any change of the simulation is captured by the communication element, analyzed and as required broadcasted within the overlay. Every element listening to the communication element receives the feedback and applies it if applicable. This reduces load on the communication process.

One important aspect is of the invention are the connections between overlays of different users. Each user receives the tracking information of all other users within the local simulation directly. If not received, that particular user remains stationary at its default position. This applies to voices as well. Since the overlay and simulation is identical for each user (but differ in overlay output due to different locations of the user within the simulation) the users themselves appear at their positions to interact with the other users. Inputs by users shown in other users' VR-space do not generate any input into the local simulation to avoid double inputs. Those are fed back to them via the users overlay into the local simulation and then received to the VR-output of the other users.

Several aspects are necessary to implement such an overlay. There needs to be a calibration, which is performed preferably by a calibration tool within the user setup to exactly align the overlay with the simulation. The user interacts with the overlay and the overlay actions the inputs in the local simulation. The overlay is updated by the outputs of the local simulation.

Since the simulation is not part of the overlay or vice versa, it is important that the overlay is synchronized with the simulation. SteamVR to Simulation: Depending on the Simulation's VR space the 0,0,0 (root) point of the head of the user shall be the same as the head-centered position of SteamVR/Unity. A reset feature is implemented. In this mode the user has to put his head straight/untilted in the head-centered position of SteamVR. When this position is reached the overlay sends the "view-reset" command to the Simulator and centers the head to the pre-determined position. The unity engine always uses the absolute SteamVR position as default. If needed offsets can be applied.

A model of the cockpit shall be available inside of the overlay. This model is translucent but uses shader properties which inhibits rendering/altering the prerendered pixels when an object in unity crosses behind it. Whenever a part of the hand is behind the translucent model in unity (overlayed model of the cockpit) the part will not be rendered ("and appears to be cut off"). That syncs the layers of depth perception again and the overlay blends seamlessly into the Simulators VR environment To implement this concept the following parts are necessary, first head position between SteamVR/Unity and simulation and second virtual walls and barriers.

1. Depending of the VR-output of the simulation, the head position may not be in the absolute position of the tracking space. It may rather be in a different initial position in the simulation with an offset and angle to the origin of the head tracking area. To overcome this issue the simulation space and offset needs adjustments to the position. The SteamVR position is the driver's absolute position. This is set during calibration phase while installing the HMD and driver software on that PC. If unity uses SteamVR/OpenVR as driver source this position is the absolute position in the Unity/overlay environment. An offset can be applied if needed. One option to implement the overlay is the combination of the SteamVR with other components.

The SteamVR is a virtual reality hardware and software platform developed by Valve that focuses on implementing room-filling (room-scale) VR applications using external base stations for positioning. SteamVR is the software component that controls the hardware of SteamVR based VR headsets such as the HTC Vive and Valve Index. The headset is set up directly in SteamVR.

To overcome the above-mentioned problem of synchronization when using SteamVR an initialization is used. Since the SteamVR setup uses the absolute position only caring about standing or seating pose of the user, the user centers the HMD/head to the absolute zero point with no angles of the head. Once reached this zero point the overlay commands the simulation to reset the simulation to the centered position of the users operating space.

It is important that the overlay does not create an instance of the SteamVR to the HMD driver. It shall be dependent on an existing VR instance and just feeds additional frames and shaders inputs towards the image already produced by the VR capable simulation. This requirement becomes obsolete if the overlay has to render the Simulation generated data (DataRefs or SimVars) by itself. Cases to apply this technique would be that the simulation only generates values and no graphical output. SteamVR can only host one instance of a VR-Output. If a new instance is registered to the SteamVR-driver the older (or currently running) instance will be shut down. Hence the VR-Output of the Simulator is shut down and does not provide any graphics to render to the HMD. It may or may not close completely or reverts back to the normal desktop output.

2. As the overlay is not a visible part of the simulation and is independent from it, it is possible to project and see things in the overlay that are actually hidden by the simulation. An exact copy of the structure or topography of the simulation is therefore important. This copy can be either requested from the cockpit provider of the simulation or virtually 3d-scanned. This virtual 3d-scanning process is not part of the overlay and not in my possession. It will be implemented in the overlay to block rendering objects (especially hands of the user) to be rendered if they are behind a wall or panel etc. The reason for this requirement is the constant distance measurement by the brain with the eyes. It checks the distance to the panel in the simulation. This creates an internal map for the brain of the topography and objects in the space. Having an object, rendered by the overlay, which is projected behind the map of topography from the brain, creates contradicting information to the stimulus. This normally results in nausea and motion sickness.

If implemented it also improves eye-hand-coordination in the VR space. As there may be no haptic feedback, a disappearing hand behind a panel will have a similar effect.

There are a couple options to get a model of the cockpit:
1. Provided by the creator of the model in the Simulator (X-Plane/Microsoft Flight Simulator).
2. Manually selecting and adjusting walls/panels/Interactables until they are placed in Unity exactly as in the Simulator.
3. Virtual 3D scanning by extracting the rays of the shaders and measuring their depth in the rendering layers.

In the following the hand tracking device communication will be explained. For a better understanding terms are defined.

LeapMotion/UltraLeap: Is a company providing a hand tracking device and embedded solution for hand tracking. The company also provides the SDK used and therefore defines the special representation of hands in Unity, hence the LeapSpace. In the context of this document LeapMotion means the SDK/API or the company providing a physical device.

Controller: This is the LeapMotion hand tracking device and its representation as GameObject/Prefab in Unity (Prefab name in Unity: LeapHandController).

FRAME: This term is used by LeapMotion/UltraLeap to describe the tracking data of the last 60 pictures taken by the controller. The LeapMotion Controller is an optical hand tracking module that captures the movements of hands accurately. This is generated by the Controller and driver for the active/first controller plugged into the PC. The invention overcomes the SDK restriction of one controller per PC. In certain environments the driver only can handle one physically controller/sensor on the PC. If multiple controllers are plugged into the same PC only the first one's data is used.

In order to recognize all hands in the scene the LeapMotion, now UltraMotion, hand sensor and its SDK is used. As per notes it is not possible to use multiple sensors/controllers on one PC. The strategy to compensate or use multiple hand recognition devices is that the SDK was searched for the object which contains the information about the hands recognized. The information is stored in the so called "FRAME". The frame can be serialized and sent via a network. Windows however cannot deserialize a file serialized on a different machine. The solution is to combine the frame and the associated other files into a dynamic link library (.dll). This DLL is distributed to all machines and the originally SDK files are to be deleted.

Since LeapMotion and Ultra merged, there is the possibility to use the haptic generating device "UltraHaptics" to immerse the VR experience. Since the LeapMotion SDK contains all commands needed to implement such a device (and with serialization also multiple devices) the overlay can create also haptic feedback as user experience. To implement the devices the position in the PC Setup needs to be known and implemented in the overlay. Eye-Hand coordination will be simplified since the user will recognize walls and Interactables not only visual but with the haptic senses of the fingers and hands as well. Field test have shown that this is useful especially for older users.

With respect to Meta/Facebook using a standalone headset with built-in hand tracking the approach has to be combined with the LeapMotion tracking. The data of each finger is available and is sent to a helper application which transforms the data from MetaSpace to LeapSpace and creates a (LeapMotion based) FRAME based on the LeapMotion SDK and DLL. This newly created frame is then sent to the receiver application and handled as such. Depending on the processing power of the headset the transformation can be performed on device or on the PC which provides the overlay. In the first case the HMD is reflecting a LeapMotion controller. In the second case the PC represents a LeapMotion controller.

The process on the HMD: The HMD runs a software that connects to its counterpart on the PC. The connection is established via either WIFI, USB or any other type. When VR-content is available and the connection established, the HMD renders the picture for the user as it would be for a coupled HMD (normal SteamVR compatible HMD). If the HMD uses any kind of hand tracking the computation of the frame can either be done on the HMD itself or via an additional program on the PC. The requirement to run a standalone HMD with SteamVR is laid out in "On PC-1". "On PC-2" discusses if the tracking data of the standalone HMD is converted on the PC to which it is connected to. A third way to generate a "frame" is on the standalone device itself. The conversion of the tracking data in MetaSpace to LeapSpace is done by the HMD and it acts as a LeapClient in the network and provides it "frame" data to the LeapServer by itself as well.

On PC-1: On the PC, the software emulates a SteamVR compatible HMD according to the specs of the physical HMD. This is then detected by the SteamVR and other VR-drivers as HMD to use to render VR content (ALVR/VirtualDesktop).

On PC-2: On the PC the program receives the string with data from the HMD. This date gets transformed into the LeapSpace and stored with timestamp into the LeapFrame format. The software then sends the generated frame continuously to the LeapServer and acts as a normal LeapController in Unity and LeapClient in the network.

A UnityLeapxAny.dll-lib was created containing all relevant information about the FRAME. Using this .dll the FRAME can be serialized to a binary. After sending/storing, this binary can be deserialized on any other device using this .dll. Serializing the frame allows the program to use multiple sensors or stored frame data.

Since the evaluation part of the "Frame" takes fewer resources, Unity can run multiple (virtual) controllers at once. The main problem was to supply the "Frames".

The chosen approach is to send the "Frames" from an external resource, here network or prerecorded "Frames" from HDD/network.

Converting the "Frame" data into a string and sending the string by any means has some special characteristics.

First the received string needs to be parsed and evaluated and retranslated into the "Frame" format. Second the string data size to be transmitted is big and generates a lot of traffic.

In general, there is no problem of serializing data and deserializing, data on the same machine. The problem arises (e.g. in Windows) when a different machine tries to deserialize data from another machine. Windows use information from the class the objects inherits from to create the object as well as other machine related information regarding this class. This means that each serialized object has it own unique header depending on version of classes and their dependents and the machine running it.

The problem was to use the Frame-given serialization C#-method (binaryFormatter) to store and send data to HDDs and other machines. The way to solve the issue is to store a class in a dynamic link library (.dll) and distribute that .dll across all machines where the de/serialization is needed. This .dll has to origin from a single source, otherwise the same problem arises again. To come by this issue on a windows machine "dynamic link libraries" (.dll) are used. A LeapMotion-dll is the aim. The created library contains all LeapMotion SDK (e.g. 3.2.1) source files. The "interactionBox" reference was removed. The original interactionBox-script was part of the measurements the 3.2.1 SDK used to get more precise tracking results. As the driver evolved to 4.0.0, the SDK version used, the driver itself became more accurate and made the interactionBox obsolete. The Frame (data) itself can be used from previous versions to the 4.0.0 version. The intercationBox part within the 3.2.1 SDK used components not available in SDK 4.0.0 which would cause the required .dll-compilation to fail (as the scripts are not there anymore in SDK 4.0.0). The interactionBox part was deleted/commented out from the 3.2.1 making it usable for a 4.0.0 compilation. The Frame in the 4.0.0 SDK is contain in the SDK's Leap.dll. The original scripts are not available within that SDK version. Therefore, the script version of 3.2.1 is used and the Leap.dll replaced accordingly. A serialized frame, which just contains all captured hands, is now storable and sendable. Using this dll (generated on one machine and distributed to other machines—same .dll at every machine), any machine in the network can send its date via a network to the overlay. The receiving machine deserializes the Frame and provides it to the virtual controller. This controller in turn evaluates the data, gets position, rotation, and gestures for used in Unity/overlay.

This method can be used to record frames and play them back. This allows provision of a virtual and interactive body once the training is conducted in single user environment.

Using the LeapMotion-Unity-SDK the controller script/GameObject needs adjustments. It needs to know the controller ID for identification. It also needs to know which source it shall use. Using Unity any script used on runtime has to be part of a GameObject. This (GameObject) might be visible or invisible to the user. The LeapMotion SDK contains scripts and so-called Prefabs (GameObjects which hold preconfigured scripts). It comes with a "controller"-prefab (LeaphandController) holding the controller script. In normal projects this would be the link between the driver running on the windows-machine, the controller/sensor and the Unity game. To include multiple controllers in the Unity-game (here overlay) this Prefab needs to interact with multiple sources of the Frame data (which was originally supplied by the driver on the windows-machine). In this project the controller prefab is capable of using the direct driver driven frame data, frame data over the network or prerecorded frames stored on the PC or streamed over the network. Sources can be "normal"—controller is functioning as per SDK (see description of FIG. 7), "Remote"—controller receives Frames from the network but does not display it via this GameObject (displayed via main controller-GameObject) and "RemoteShow"—controller receive Frames from the network and shows/acts as hands supplied as a normal controller.

The process of displaying the hands is as per SDK documentation since only data reception of Frames is altered. This approach is the part where the GameObject controller in Unity is made capable of receiving the specific frames from the frame provider. Each controller now can access the frame provider (which is not part of the original SDK) and handle/display the hands in the frame as they were supplied by a physically attached controller.

The LeapServer is the central collection and distribution platform of hand tracking data. The LeapServer is part of every overlay-Setup. It collects incoming data from sensors which sending their data to the PC.

The LeapServer communicates with the physically plugged-in controller, frames provided from network or HDD/storage and unity-based controller GameObjects.

Each LeapServer handles all "FRAME" data for its user's overlay. The overlay can receive and frames via TCP/IP of any network. Therefore, a thread within the application provides a host to connect to other machines providing frames. There are preferably two parts.

The first part takes care of establishing, maintaining and cleanup of connections with controllers. The other part manages the data received from the controllers and distribute them back to the graphical representation in the overlay.

To establish new connections with a remote controller, one thread is accepting TCP/IP connections on a specific port. If the connection verifies as a controller used in the scene a new thread is created and is bound to the controller ID. If the remote controller sends a new FRAME, the thread tries to place that FRAME data into a list (FrameGrabber). A mutex avoids a file corruption while reading and writing in the list. Since the FRAME, data contains the information of the last 60 pictures taken by the controller camera, there is no problem with skipped FRAMES.

Parallel the second part copies all FRAMES from the controller from the list (feed by the FrameGrabber) and places the FRAME data to individual controller instances of the scene by dispatching an event. The controller then enables the presentation and/or interaction.

The FrameGrabber is a co-routine of the LeapServer (running in each overlay environment). Each controller GameObject awaits an event to be triggered by the driver to access the FRAME from the physical controller. Since there might be multiple controllers (GameObjects) present in the Unity/overlay environment (e.g., the Frames needed to see the crewmembers hand motions) the LeapServer/FrameGrabber collects the Frames from those multiple sources (direct/network/played back) and dispatches an event for each controller if new data is available for them. This data is handled by the GameObject as it would be received from the native driver. Due to limitations of mono/C# to access/read lists and dictionaries in the RAM at the same time as they are written into it (RAM), the FrameGrabber handles the read/write access in such a way that it avoids corruption of data or accessing an empty/non-existing array.

The LeapClient takes the frame from the LeapMotion controller driver and serializes it in order to send it to LeapServer via TCP/IP of any network. The overlay can provide its own client in order to send the data to other users in the network.

The user environment can host a large number of tracking devices. The module LeapMotion/UltraLeap, which can be a separate program as well, consists of several elements.

One module starts the communication with the devices. The element searches the local and remote devices for hand tracking. This accounts for the controllers which are not directly connected to the PC. This is due to the issue that the driver only can handle one physical device directly connected to the PC. It can be USB managing thread or a TCP connection. Once a connection is found from a hand tracking device, another thread/element will be started taking care of only this device. The serial number of the LeapMotion controller identifies it. Whenever new tracking data is available, it will be provided to other elements. The other elements are the controllers (GameObjects) awaiting data from remote sources (network or played back). One controller GameObject/Prefab in the unity scene is in "normal" mode (of the altered LeapMotion SDK). In the "normal" mode the GameObject/Prefab is acting as it is intended by the SDK provider. The other controllers/Prefab are in "Remote"/"RemoteShow" mode, because their physical representations/source are not attached to the PC directly via USB. It can be prerecorded Frames or another user its controller.

Another thread collects all new data and collects them to a dictionary. A fourth tread type copies the dictionary and assembles a single frame with all tracked hands. If tracking spaces do overlap multitracking of the same hand will be mitigated. The physical controller has a certain area/space where data tracking is accurate.

The hands which are further away might be detected and shown as well by multiple controllers causing multiple controllers to detect the same hand simultaneously.

The controller in "normal" mode checks for any hands which are detected on multiple controllers by calculating (in UnitySpace coordinates) the distance between all hands, starting with its own (that tracking data is most accurate). If for the same hand orientation (left/right) the distance is less than 5 millimeters the additional hand will be disregarded. In this instance if hands from two different LeapMotion controllers are too close together (0.05 m) main LeapMotion controller (HMD-mounted and directly connected to that PC) takes precedence. If one hand is tracked by two (or more) other controllers (not directly connected to PC and not the HMD-mounted) the controller which connected to the overlay first takes precedence.

This would render the previous discussed interactionBox obsolete as now the main controller in the scene evaluates which hands are "usable" and which are duplicates and which tracking data is unreliable. All processes are running parallel. Mutexes are used to ensure asynchronous processing. Garbage collection and thread monitoring ensures that stalled threads are canceled and if needed restarted. Therefore, hot plug and a lost connection recover is implemented. This process is independent from the device used. The data is transformed into a common format. The common format is the FRAME. It is used by LeapMotion, Varjo and Ultra-Leap. The data is stored in LeapSpace and only converted to Unity-space and SteamVR-space when used by the controller GameObject. The controller GameObject/Prefab is the representation of a physical controller in a Unity scene. The Unity scene provides the overlay function and data to display.

SteamVR is used to bring the graphical output of the overlay to the HMD while another VR-application is running on that device (simulator).

The only time SteamVR-space is converted to Unity-space is to get the HMD position within the Unity scene.

In the overlay everything is calculated to Unity-space and SteamVR calculates it to SteamVR-space when it is generating the graphical output to the HMD.

It has to be noted that Unity-space and SteamVR-space are more or less identical. Difference is offset and tilt. Distances shall be the same.

Hand tracking of Meta's® standalone VR devices can be used as well. Collecting the available hand and head tracking data, the HMD sends this data to an IP address. Another application will manipulate the data from the Meta/Oculus space into the LeapMotion space. Thereafter it sends the serialized data to the overlay or any other capable receiver. This other application will have the same output and behavior as the controller function when it sends its frames to the other user's overlay.

When using the Oculus or any other standalone HMD a WIFI connection is necessary. AVLR or VirtualDesktop (external third party programs) emulating that standalone HMD into a SteamVR compatible device. Both programs use either Cable or WIFI. Nevertheless, it has to be connected via WIFI to start those applications, hence using this network to send tracking data of the HMD position and hands tracked. It is available as a built-in version or an external program running on any PC in the network.

In case of a coupled HMD the SteamVR driver takes care of displaying the content to the headset and feeds back the tracking data to the Unity environment. This data is used to feed the head position to other clients of the simulation to ensure natural feeling of the team member its avatar.

A standalone HMD, head mounted device, e.g. Meta's Oculus Quest 2 needs to be coupled via an emulator. The emulator contains three parts ("On HMD", "On PC-1", "On PC-2").

On HMD: The HMD runs a software that connects to its counterpart on the PC. The connection is established via either WIFI, USB or any other type. When VR-content is available and the connection established the HMD renders the picture for the user as it would be for a coupled HMD. If the headset is capable of tracking hands that data is sent to the PC as well. The program sends a string containing all available positions and orientations of each bone and joint in relation to the HMD. Depending which software is running on the PC this could be done by the same connection ("On PC-1" 0 as standalone solution, which includes "On PC-2") or another to an additional program on the PC ("On PC-2" as a separate software program).

On PC-1: On the PC, the software emulates a SteamVR compatible HMD according to the specs of the physical HMD. This is then detected by the SteamVR and other VR-drivers as HMD to be used to render VR content (ALVR/VirtualDesktop).

On PC-2: The program receives the string with data from the HMD. This data gets transformed into the LeapSpace and stored with timestamp into the LeapFrame format. The software then sends the generated frame continuously to the LeapServer and acts as a normal LeapController in Unity and LeapClient in the network.

The overlay can host a multimedia presentation. The user interacts with the content via simulator and feedback to the media player or the presentation and it content directly. This means that either inputs into the simulator directly or into the media player are possible.

When using the direct mode, the interactable object sends the commands directly to the media player as well (media player and ConnectServer). When using the sim mode responses, the media player uses sim feedback to verify inputs.

The media player can either evaluate the user's inputs by scanning the output of the simulator (DataRefs/SimVars/simstate) or by monitoring the inputs the user makes to the switches. Depending on the Remote/RemoteShow—mode of the controller setting the interaction is directed to the presentation or the simulation.

With those settings the "normal" controller knows if the hand can interact or not.

The media content comes in a container, Multimedia container.

The content is a video or presentation, objects and a table that includes the commands needed to be achieved by the user and their time spot/progression within the video/presentation when to achieve them. It is delivered and loaded as a Unity AssetBundle. The player loads it at runtime. This allows content being deployed without altering the program itself (compiling). The AssetBundle is located either locally or in the network.

The AssetBundle (named exactly as the media file in CSV-Clipname) includes all objects loaded from the overlay when a new media file is loaded into the media player. The reason of an AssetBundle is that shaders and textures are included. Otherwise, they have to be installed into the overlay environment. If they were not included into the bundle default shaders and textures would be used. The result could be mismatching colors or empty objects being displayed. The Assets should be compatible with the Unity version the overlay was built/compiled with.

Interactables/components which need to interact with the simulator itself have an activation and check routine when loaded to register themselves to the media player and the simulator ConnectServer.

All loaded components can be individually customized by the provider's needs.

If references beyond the overlays scope are needed those need to be provided within the AssetBundle. This means if a third party AssetBundle (e.g., from unity the unity store or package manager) is required it needs to be part of the loaded AssetBundle/media content.

The CSV-file in the AssetBundle is formatted as following:

Clipname: name of the clip/media file (same name as CSV-file) or path the file. A version check is included to avoid download of big data sizes every time a video is loaded. If already downloaded the file on the local machine is used.

Duration: self-evaluation attribute

Resetcommands: the commands/DataRefs needed to reset the simulator to a specific start state (when media progresses and inputs (commands are made the DataRefs alter and differ when skipped or scrolled through the content of the media)). The content provider has the option to preset any simulator state at any given time/position in the media content.

Resetloads: prerecorded simulator scenarios (save games) which guarantee simulator settings for each media content.

Sub tables:

Objectname: GameObject name (component)

Scale: scale of the component

X, Y, Z: coordinates in relation to scene root (zero)

A, B, C: rotation in relation to scene root (zero)

Times table:

Starttime: at which progression time/state the component becomes active

Endtime: at which progression time/state the component becomes inactive

To enable the functions Forward/Skip/Rewind the media player stores the initial setup, every relevant DataRef and the inputs required for each step of the CBT (computer based training)/presentation. During the CBT the media player crosschecks the DataRefs of the simulator with the prestored one, while receiving the inputs of the user, either via direct input (switch selection of the user is also transferred to the player) or via the result of switching a switch when the DataRef changes in the simulator. Therefore, an evaluation of the user inputs is granted.

Vice versa the required inputs can be done by the media player itself. If the user rewinds the presentation the video player resets the simulator to the initial state. Then the media player switches the switches in the order of the content and updates the DataRefs accordingly. This guarantees the user experiences a consistent simulator behavior. It is the content provider's responsibility to ensure all required DataRefs are in place. Additionally, during loading of the CBT/media a stored flight could be loaded. This can be placed into the AssetBundle as well. While the CBT/media content awaits a user input the user himself can skip the input on demand. This triggers the video/media player to place the required input by itself. To the Simulator the input would be exactly as if the user had done it. Feedback of this action is monitored and depending on the settings sent for evaluation to the training provider or whoever is responsible of receiving it.

The media file contains a video/narrative or any sort of presentation. It can be a browser or text file as well. The table picks up the time line or progression of the presentation or media file. It will activate or deactivate the objects loaded according the timestamp or user inputs/simulator outputs. When the time comes, objects are activated and the user can see and interact with them in the overlay. They are deactivated if they reach another timestamp marked to do so.

At some point, the user is required to do an input. This pauses the presentation of the media. If the media player then receives the input, either directly or the feedback from the simulation, it continues. The algorithm checks the input if it is correct or points out an incorrect user input. The media player can handle multiple inputs. If a specific order of inputs is required, the time stamps will be set chronologically.

If the user uses the time line to skip the video or to jump to another time the media presentation resets the simulation and triggers/sets all values according to the intended contentment to have a correct set sim each time.

There are preferably three major Interactables comprising rotating knob, switch and button, others are possible.

Most of them have similar setup conditions:

Acting range: the range in which a lever or knob can be moved

Initial position: the position when starting the overlay

React immediate: if checked the component generates an output while it is used

Option list: number of positions a switch has

Data ref feedback: the position of a switch in the simulation

Data ref range: range of the feedback value from the simulation

An additional script is used to meet the required output for each simulation. It contains:

Server ready: a Boolean to check if the communicator established a connection to the simulation and is ready to accept and send commands to it.

Triggers: partial command strings, which adds depending if the value of the switch is increased or decreased, held in position or to comply with any other needs by the simulation.

Trigger "simulation" command output: this action event communications with the ConnectServer.

Similarly, it takes the feedback of the simulation from the ConnectServer and evaluates it according the switch position in the overlay. If needed it manipulates the interactable and inhibits a back loop of triggers when it moves to that position. This function synchronizes the overlay with the simulation.

The Rotating knob can be rotated left/right between 0° and 359°. It can snap into positions or can be spring loaded in positions. If a continues rotation knob is needed use two left and right spring loaded positions and set "triggers" and "react immediately" options to active.

The switch refers to a rocker type switch. It is used for any switch, leaver or even door handles. The switch can be set between −60° to 60° around the center position. It can snap into position or can be spring loaded. Triggers are used to communicate to the simulator that the switch is held in position.

It may be necessary to use a plugin to do so. The button is a normal button of push type. Touch type is possible if setting triggers to a single command. Using triggers, the setup varies between on/off type, push and hold or alternating through a list of triggers/commands.

The local Simulation can be any type of VR application that uses any kind of API to communicate to other applications. It should be capable of hosting multiple users manipulating it or have a data synchronization function to other simulations of the same kind. If neither case is possible the overlays take care of the synchronization by transmitting the feedback (DataRef/SimVar changes) of the simulators to the other overlay and use other overlay's ConnectServer to update the other simulator. The same applies regarding the update of the global simulation.

Depending how the API accepts communication it may be necessary to implement helper functions in form of plugins. These plugins use the official API and official commands within the API to achieve behavior that is impossible to achieve via normal command structure. For example, in X-Plane, it is impossible to hold a spring loaded switch in position via a UDP command. Therefore, sending a command that is not available within the native API commands but established via the plugin. Within the simulation, it is possible to hold a switch down in a spring-loaded position. Once the custom UDP command is received the plugin acts in-simulation as the user would hold the switch in the desired position.

The global scenario places several local simulations and/ or hardware in the loop systems in a context to each other. Similar to a multiplayer game but instead having individual users participating they are replaced by the local simulations. The communication structure with the local simulations is the same as the one with the users. Hot plug feature to add any number of participating simulation or HIL (hardware in the loop, which can be a physical system which also has an API and is connected to the global scenario) systems grant a seamless continuation of the scenario even if one participating simulation/HIL fails or gets disconnected.

To communicate with any simulator the official APIs and SDKs, provided by the simulator company has to be used. This ensures that the certification of the simulation is still valid and the usage with the overlay will not alter this. The API may be assessable directly like on FSX or Microsoft-FlightSimulator. This would refer to a direct approach or an API approach in a different language. It may also be accessible via a network (UDP) connection like in XPlane 11/12.

The central communication point to the Simulation is the "xxxConnectServer" (XPlaneConnectServer, SimConnect-ConnectServer, etc.). In Unity this GameObject handles all the communications between the overlay as a whole project and the Simulation.

This GameObject takes care of converting the Command- or DataRef-strings generated by the Interactables and converts them into the format required by the Simulator.

Vice versa it converts the output of the Simulator in formatted strings and broadcasts them into the overlay. Every interactable or the media player subscribed to the broadcast checks if that string is applicable to that Interactable/media player. If it is the cast the interactable/media player evaluates the feedback and acts accordingly.

The ConnectServer communicates with Simulator. This can be achieved in multiple ways.

If the APS/SDK is written in Mono/C# the implementation is directly embedded in the overlay. All conversions, outputs and inputs are implemented according to the SDK directly into the ConnectServer.

If the API/SDK requires a network connection the ConnectServer will establish a network connection with the Simulator and sends/receives the commands formatted according API/SDK accordingly to/from the Simulator.

If the API/SDK is written in another language another program or windows service is used. This service is written in in the required programming language. A directional data pipe connection is used by the ConnectServer to place the generated strings from the Interactables/media player into that service/program. The program then converts those strings into commands/events or DataRefs/SimVars and communicates with the simulator according to the API/SDK.

The aim is to have only a single GameObject/Service that needs to be configured for the type of Simulation used on the individual PC. Except for the commands and DataRefs used the overlay has not to be altered/recoded to adapt to other Simulations. Depending on the API and SDK used this ConnectServer receives standard preformatted strings from the overlay and prepares those to interact with the Simulation. Vice versa, it receives DataRefs and outputs from the Simulation and distributes them to the overlay. The data exchange between overlay and Simulator is performed in the same way as one would do it with a mouse keyboard or joystick (with feedback). This is where the overlay takes inputs into the simulator and sync itself with the simulator state.

Every time a DataRef is received the ConnectServer sends an Event to the overlay. All the EventListeners (Interactables or MediaPlayer) will receive the DataRef/Output. Individually they are checking if the DataRef is applicable to their function. This will reduce the task workload on the ConnectServer side because the threads running parallel can evaluate the Event in the applicable pace without slowing down the server (Singletons and Events problem is mitigated). If the DataRef is recognized by a GameObject it uses it according its functions. Since an Event is used there is the possibility that multiple GameObjects are using the same single output from the Simulation.

The ConnectServer is part of the overlay. It is the point which connects via API/Network/SDK to the simulator.

In the following the exchange of information from hand to simulator is discussed.

The handtracking interacts with the Interactables (button/knob/switch).

The button/knob/switch device translates it to a command or DataRef and sends it to the ConnectServer.

The ConnectServer interacts with the simulation via API/network/SDK.

In the following the exchange of information from the simulator to the overlay is described:

The ConnectServer receives DataRef from the simulator via API/network/SDK and translates it to a button/knob/switch device command.

The Button/knob/switch device receives command/position and checks if applicable. If applicable it switches into position to be in sync simulation.

If the API and SDK contains a library written in C#, there is a high likelihood that Unity/overlay can access the commands and Data given by the simulation directly. SteamVR outputs the graphics of the overlay ontop of the Simulator graphics (hence overlay) and inputs HMD position data to the Unity scene.

In Unity the GameEngine (mono/C#) provides computation of head/handtracking and therefore inputs into Interactables. —Here the development environment grants access to the SDKs (if written in C#) for direct implementation of communication to the simulator. In such case the instructions of the API/SDK can directly be implemented and used by the Server.

When using a different language than the overlay (Unity/C#) uses windows service with string inputs (Commands/DataRefs) and outputs (DataRefs) to communicate with the Simulation. The Windows shall be installed on the PC of the Simulation and be accessible to start and shut down by another application (Unity/overlay). On loading the overlay, it starts the service. The Service connects to the Simulation (MicrosoftFlightSimulator or FSX/Prepar 3D/4D). The service contains two data pipes. One to send commands from the overlay to the Service. The second sends the responses (DataRefs) to the overlay. If the Service receives a command (or DataRef) from the overlay it uses a wrapper to transform it into the native API language and sends it to Simulation. The service can receive DataRefs/SimVars from the Simulation via a wrapped function. The usage of a wrapper function is necessary if the API/SDK is written in a programming language with unmanaged code structure (C, C++) within a managed code (C#) environment. Unity's capability to facilitate unmanaged code is limited, hence the usage of an external service or helper program. This eases the usage of a pipe connection between the overlay and the service.

In this case commands/DataRefs are the commands the overlay would like the simulator to perform in accordance with the input of the user to the overlay.

The (Windows) (Helper) service is the communication connection between the simulators API/SDK (written in "not-C#" and no network API available) and the overlay. The commands of the overlay are sent as strings via a pipe. These strings are available in the Service now, even if the service uses another programming language. Using those strings, the service translates them into commands/DataRefs in accordance with the "non-C#" API and sends them directly to the Simulator.

Vice versa if the Simulator updates a DataRef the Service gets the API response, translates it into a string and sends it via another pipe to the overlay, where the ConnectServer acts as described before.

To access the API of XPlane 11 the user/developer shall use a UDP connection to the simulation host PC. This connection can directly be established via a GameObject in Unity. This GameObject script runs continuously and establishes a connection to the simulation host IP. Once the connection is established an Event is triggered which indicates the status of the connection to the simulation. After successful connection, the Interactables or the Media content can send strings to this ConnectServer. The ConnectServer translates those strings into Commands or DataRefs by a combination of lookup tables and DataRef builder. This happens in accordance with the API/SDK guidance. After successful creation of the command or DataRef, it sends this to the Simulation via UDP. In some cases, the Interactable needs to be held in a certain position by the user. This is not directly achievable via a UDP connection because a command is just triggered once. There is a function to hold an object within the simulation. This is only accessible inside of the simulation (XPlane 11). A Plugin could access this. Since a Plugin is a direct alternation of the Simulation, it could alter the certification status. To still achieve the "hold down function" the simulation provider shall provide the Commands to trigger a "hold down" and "release" of a Simulator function which then can be triggered by an Interactable. For testing purposes, a Plugin was created which establishes new commands for "hold down" and "release" for existing commands. These commands are stored in an Excel spreadsheet and used by a StringBuilder to create the Plugin (.cpp file) and the new commands for the lookup tables. To use the Plugin: Compile the source code and place the Plugin into the Plugin folder. The certification of the Simulation is not compromised by this method since the Plugin does not generate or alter any DataRef within it. It only provides other means of accessibility of predefined and already certified functions.

BRIEF DESCRIPTION OF DRAWINGS

FIG. 7, 7A, 7B show how the LeapMotion Controller communicates with Unity, and the different methods of getting the tracking data (FRAMES) to visualization on the overlay;

FIG. 12A, 12B, 12C shows different approaches how the "ConnectServer" functions.

DETAILED DESCRIPTION OF EMBODIMENTS

Figure 1:
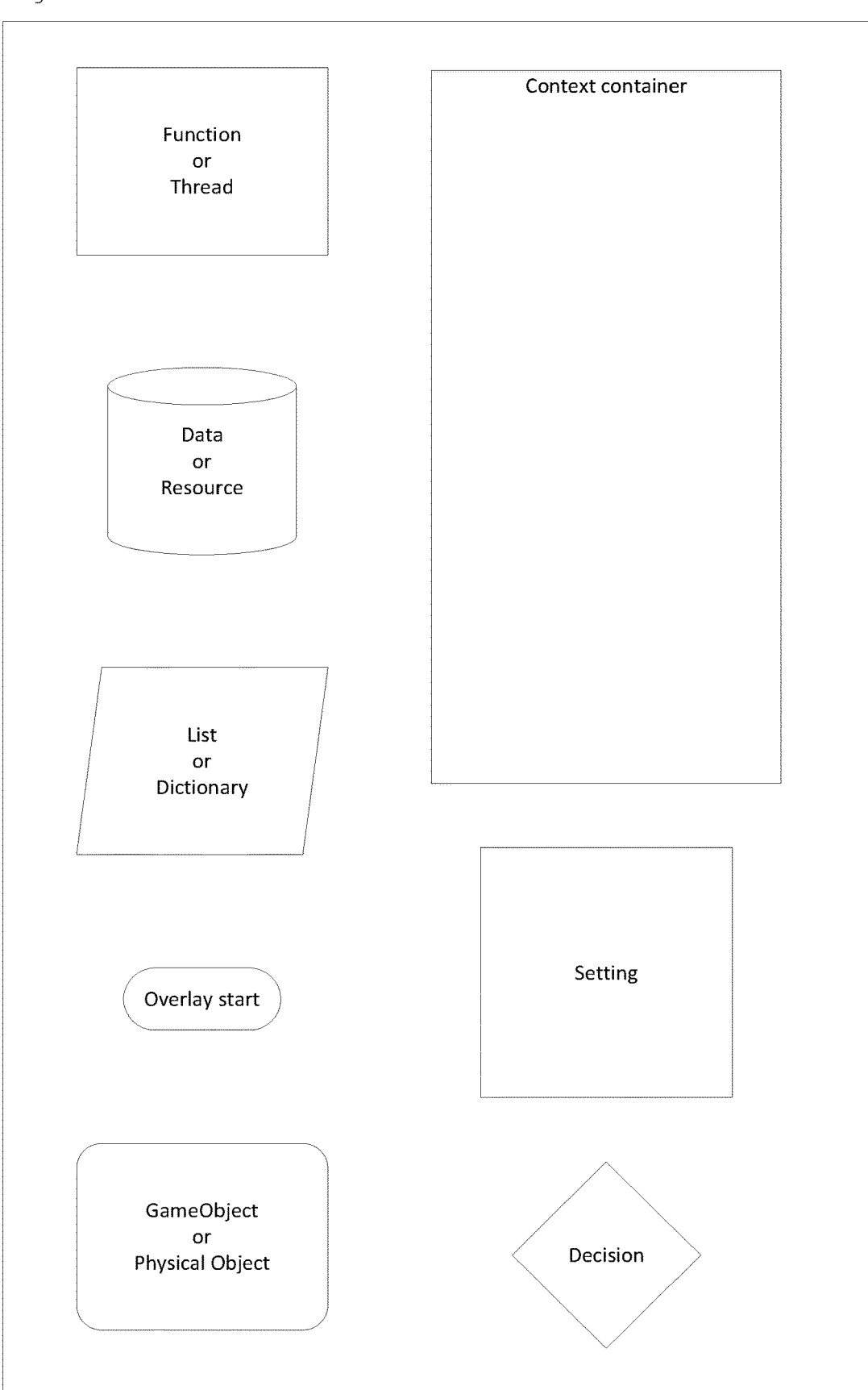
FIG. 1 gives an overview and an explanation of the symbols used in the figures.

FIG. 1 shows the meaning of each symbol of the following figures. It is an aid to understand in what context this information has to be placed.

Rectangular (sharp corner): This symbol represents a function or a thread which operates an essential function. As a function it has to be called. The thread is running and operating constantly on its own.

Can: The can represents a resource. It can be an API/SDK, a given list or functions/data generally available throughout variable resources.

Trapezoid: This represents a list or dictionary to store data. This is either public or internal.

Bean: This symbol represents the condition prior start/ initialization. It is used in diagrams in which it is symbolized the steps taken until the Overlay is running as a routine.

Rectangular (round corner): This symbolizes a physical object (with its API/SDK) or its representation within the Overlay engine (Unity). It can also be a (altered) Prefab.

Rectangular (expanding and sharp corner): This represents a specific context. Within this container a function/ thread or anything else is explained in more detail. This in the bigger context it shows its interactions with other modules or components of the project.

Square (straight and sharp corner): This symbol represents important settings to be made in order to get to the wanted behaviour of the API/SDK and engine.

Square (diagonally and sharp corner): This symbol represents a decision to be made and opens multiple alternating program paths.

Figure 2:
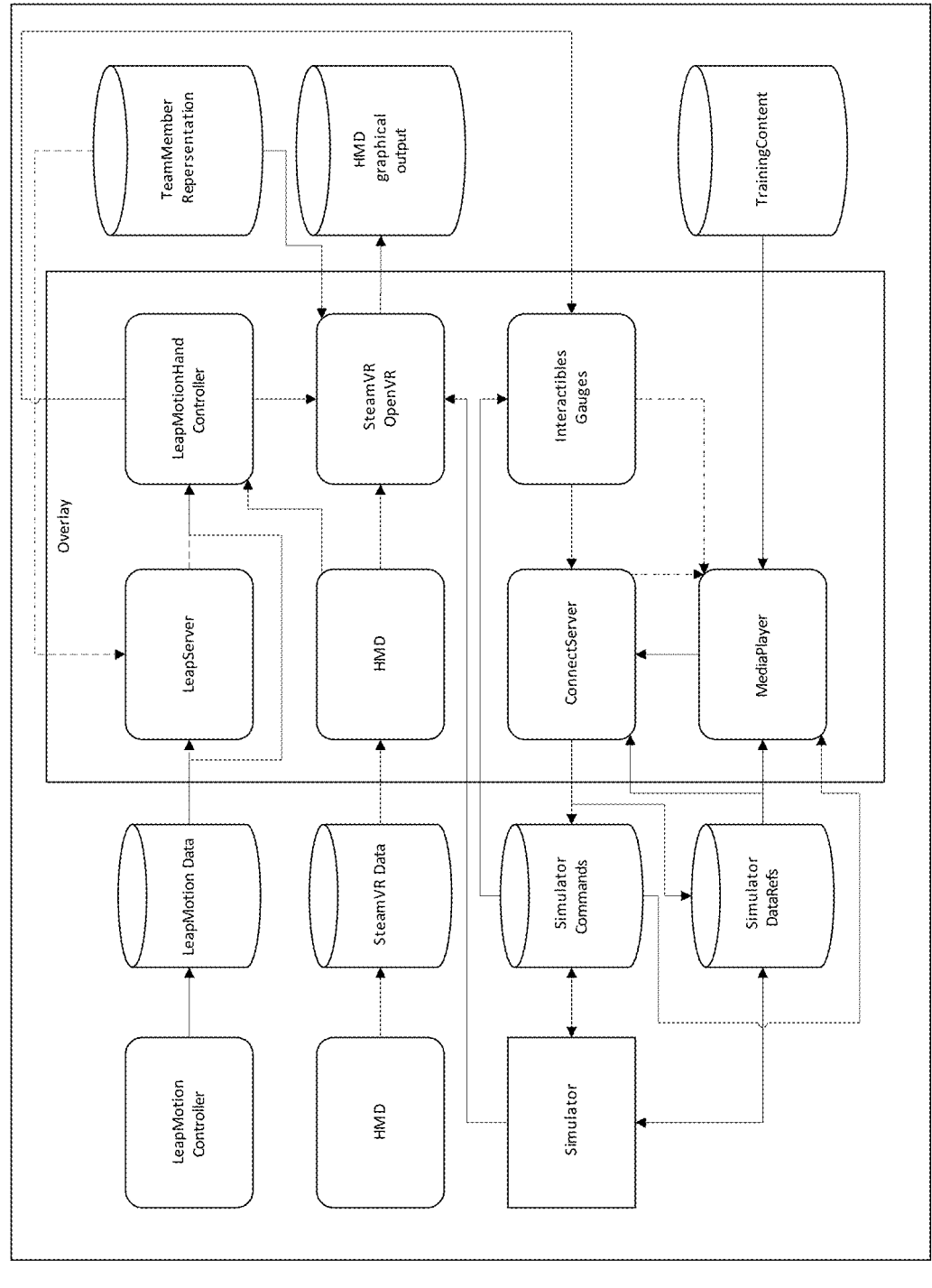
FIG. 2 shows the overlay design structure.

FIG. 2 represents the Overlay and its interacting components. The "LeapMotion Controller" is generally the physical controller attached to the overlay engine either directly via a USB cable to the user's PC or via a network connection (as network device) or as prestored data as playback inputs. It provides incoming tracking data called "LeapMotion Data" or FRAME. This "LeapMotion Data" or FRAME is either directly processed by the "LeapMotionHand Controller" (altered Prefab) or by the "LeapServer". "LeapMotion-Hand Controller" and "LeapServer" (altered Prefab) are both GameObjects with the overlay engine in Unity.

The "HMD" is the physical head mounted device of the user. The driver for this has to be SteamVR in order to provide "SteamVR Data". This data is processed by the overlay engine written in Unity and uses "SteamVR" and "OpenVR" API/SDK to initialize and utilize the driver in the engine. It also contains tracking data. Similar to this user's data ("LeapMotion Data" and "SteamVR Data" tracking data) the data of other users can be shown in the overlay engine, this is symbolized by the external "TeamMembers Representation" resource.

The "Simulator" may provide graphical output to "SteamVR" and the overlay engine provides its Overlay overlayed via "SteamVR" and "OpenVR" as an output resource to the "HMD" called "HMD graphical output". The "Simulator" also provides "Simulator Commands" and "Simulator DataRefs" via API/SDK to the overlay engine. "Simulator Commands" are used by the "ConnectServer" to use the simulator's API/SDK to control the "Simulator" by the user's input via the tracking data to the "Interactables" as the would use the "Simulator" as per Mouse and Keyboard. Vice versa can the overlay update "Gauges" and "Interactables" with the received "Simulator DataRefs". It is also possible that the "ConnectServer" can set "Simulator DataRefs" directly according to the overlay's setup.

The "MediaPlayer" displays external content to the overlay which can interact with the user (overlay) and "Simulator". It can set and reset "Simulator DataRefs" according to the process of the content. It can assess user inputs to "Interactables" by monitoring them or monitoring the output changes of the "Simulator DataRefs". It can display anything the content creator wants on top to the current "Simulator" or overlay by using the "TrainingContent" resource.

Figure 3:
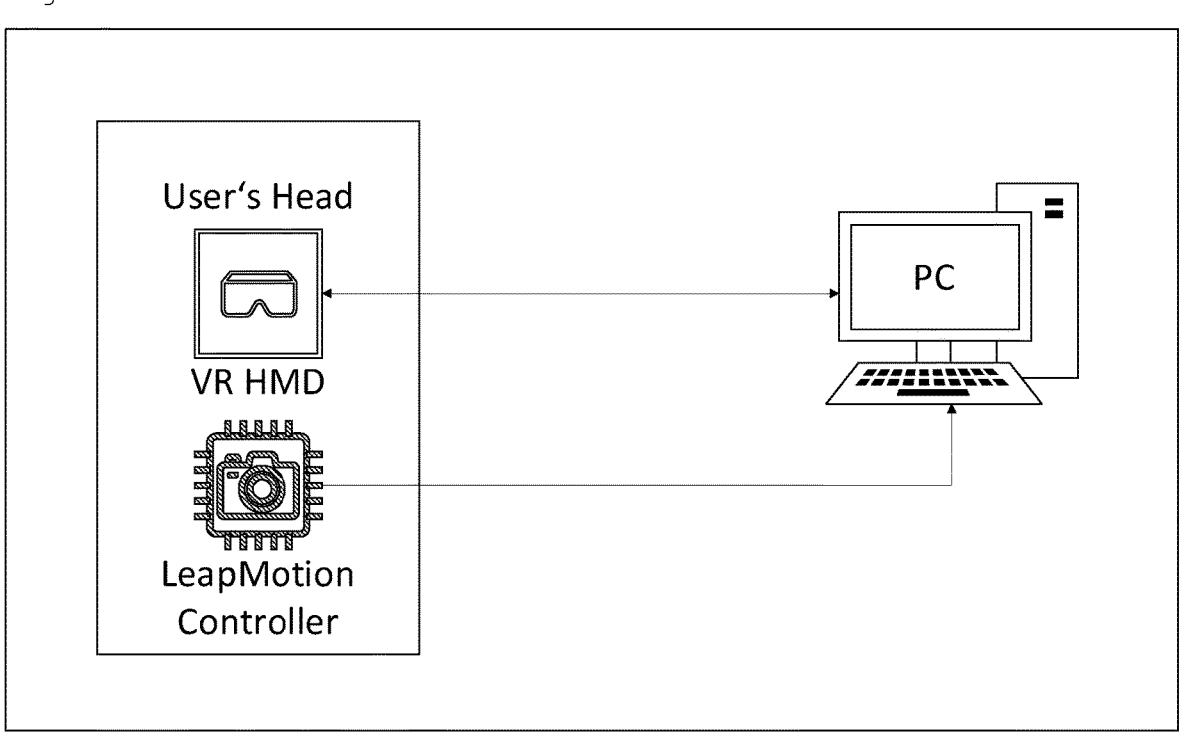
FIG. 3 shows a hardware user setup of a single user.
Figure 4:
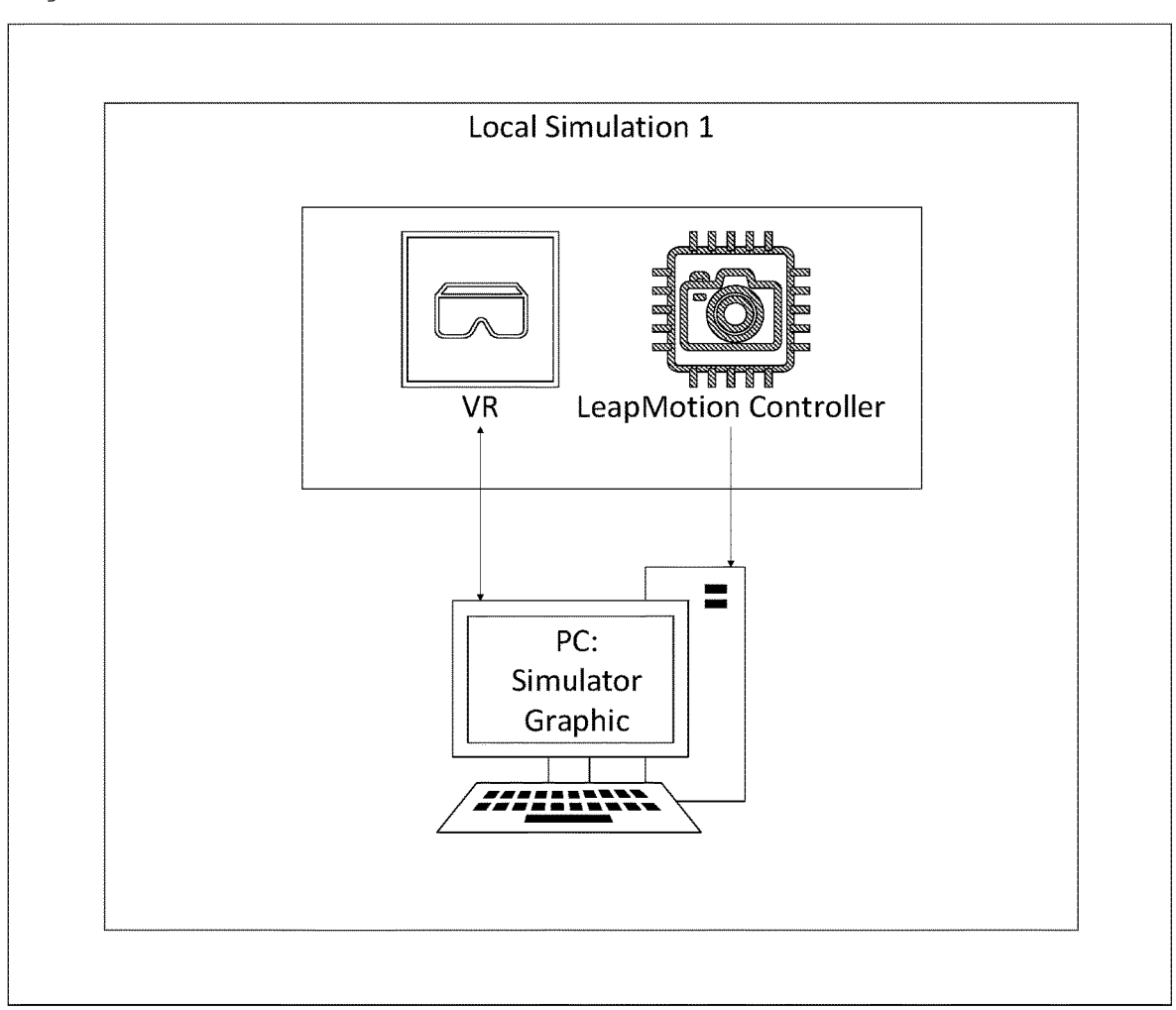
FIGS. 4, 4A, 4B, 4C, 4D, 4E, 4F, 4G, and 4H show the hardware setup at several local simulations of user and users.
Figure 4A:
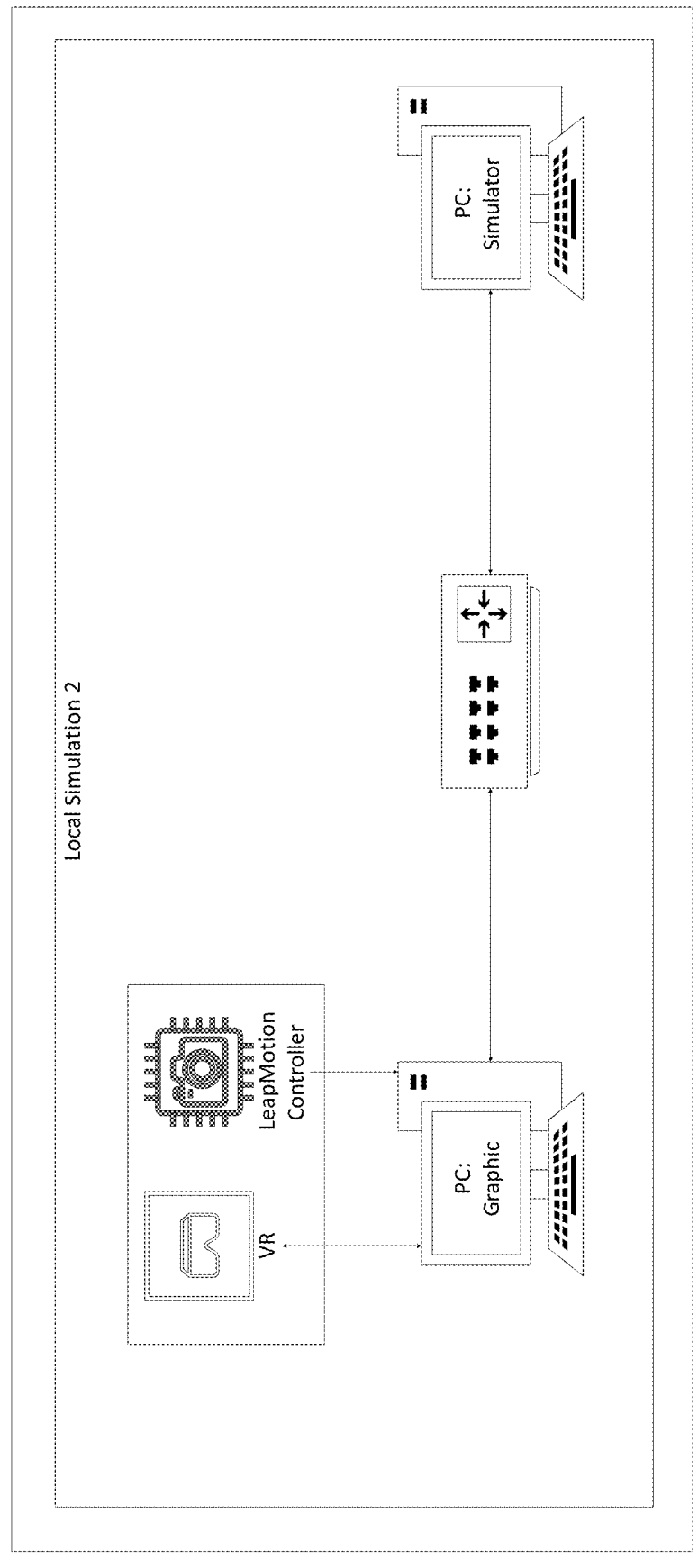
Figure 4B:
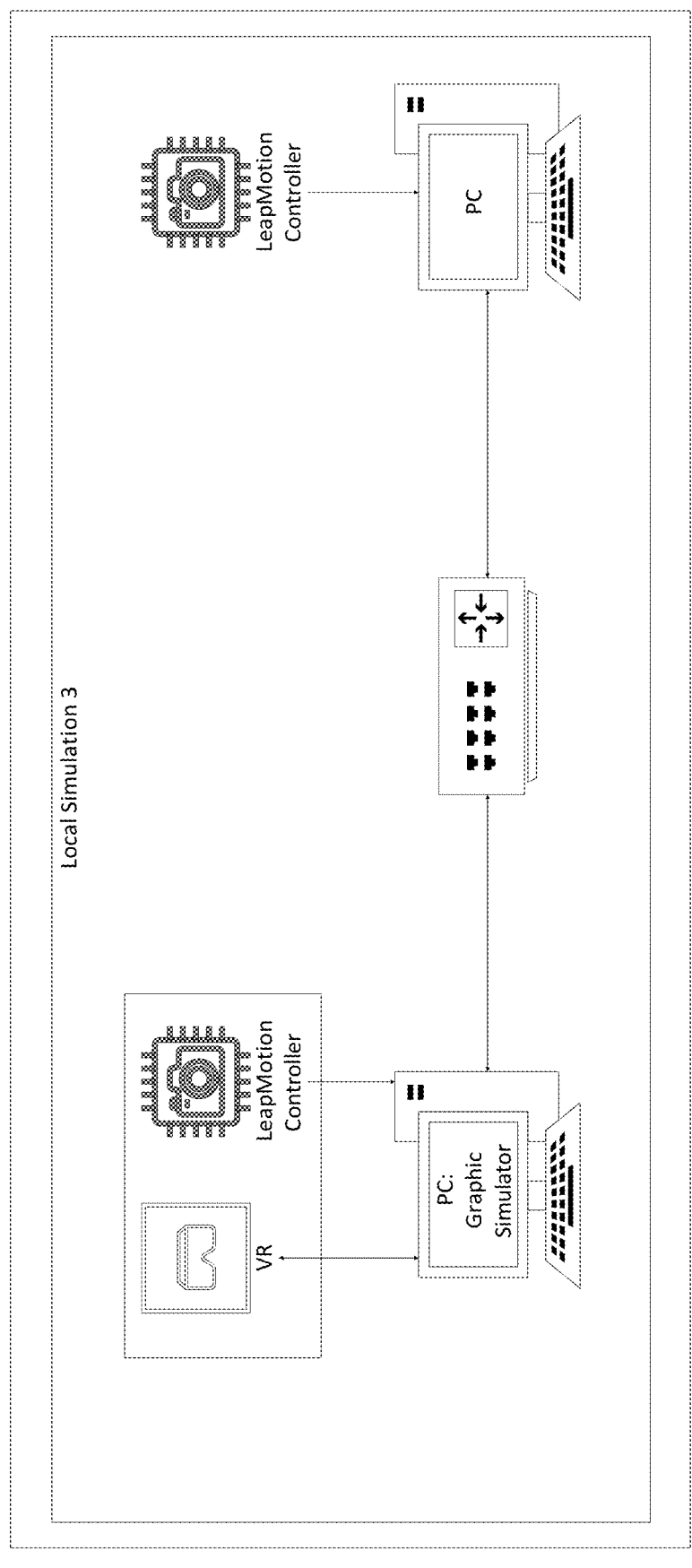
Figure 4C:
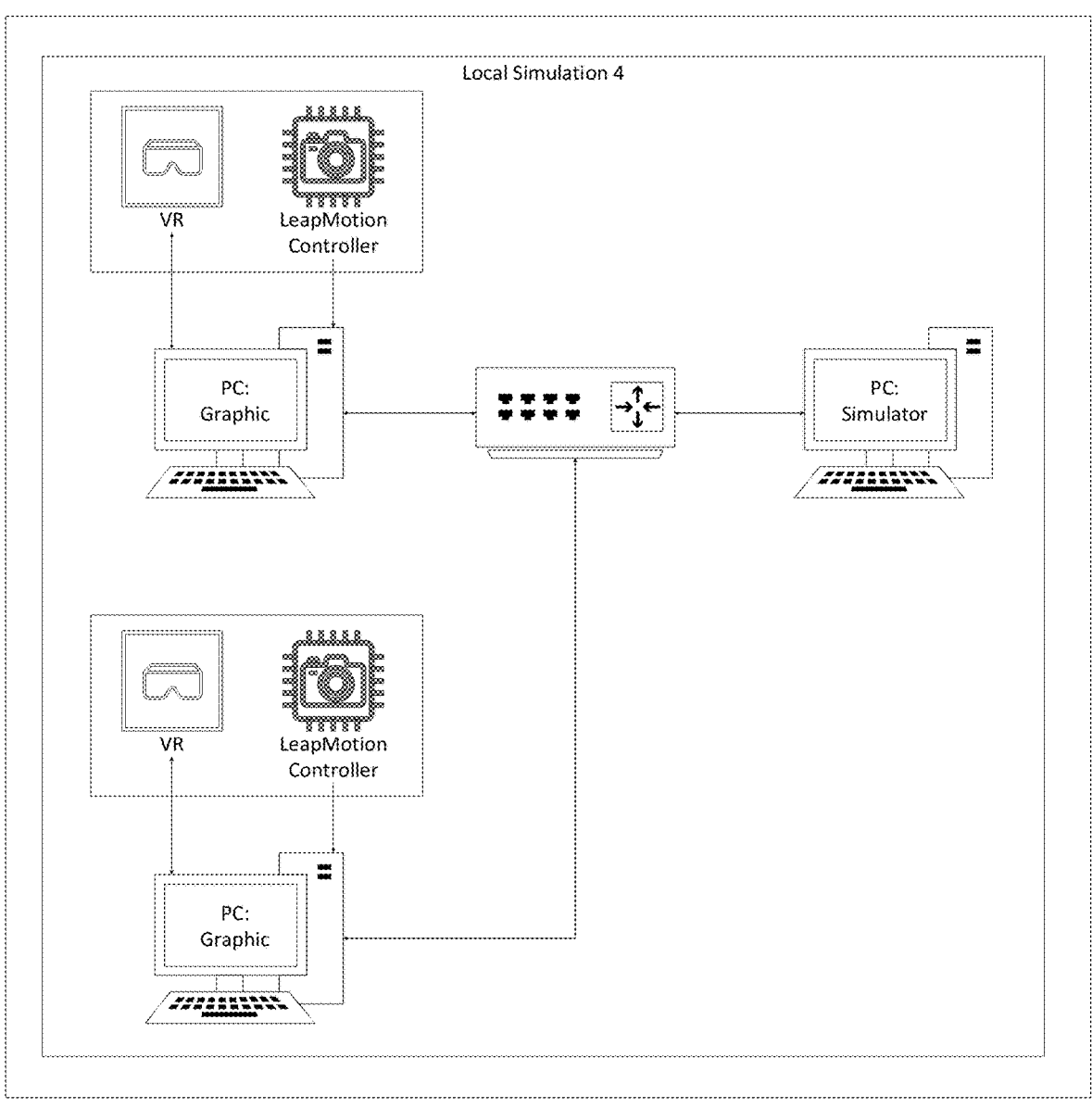
Figure 4D:
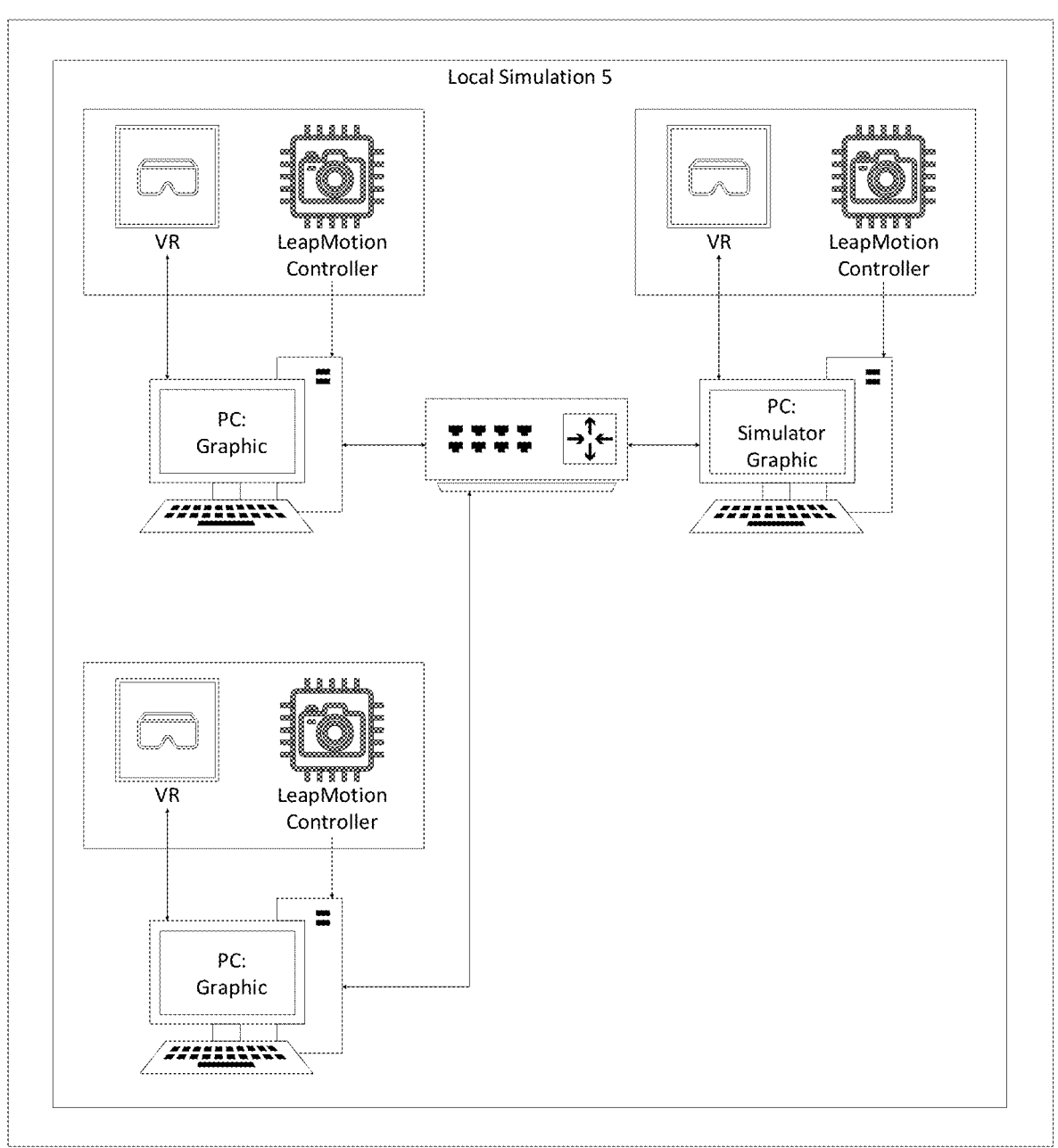
Figure 4E:
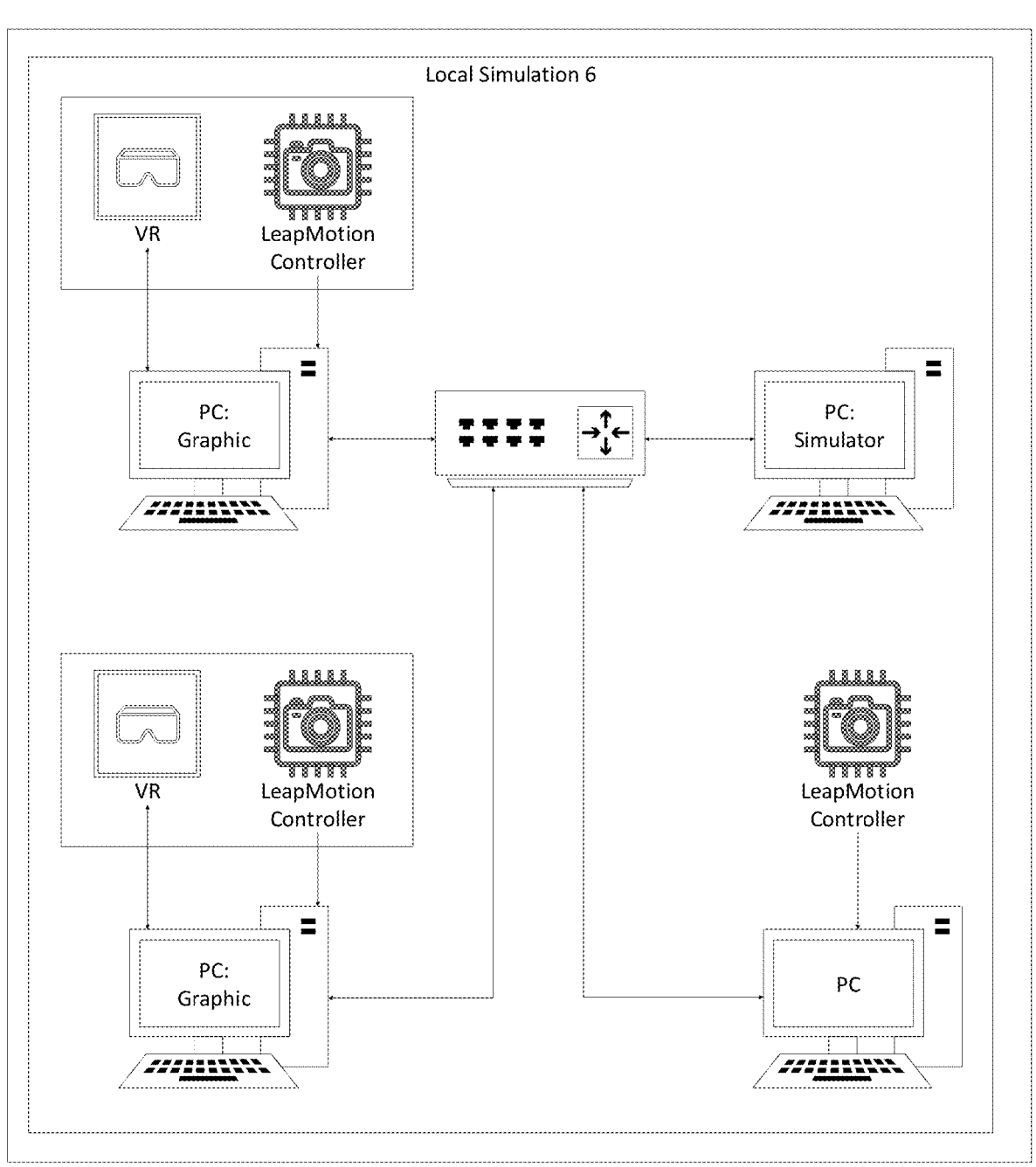
Figure 4F:
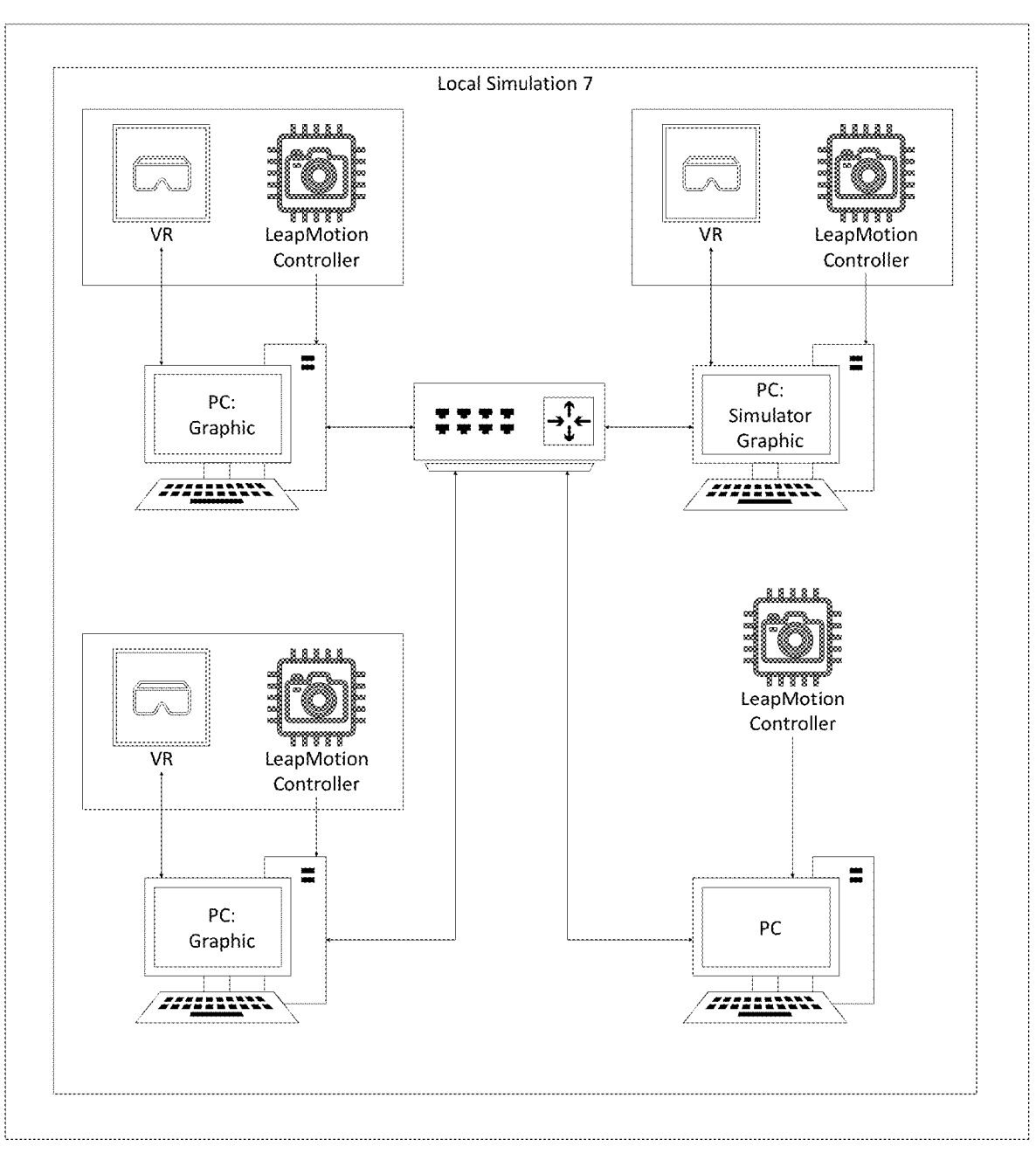
Figure 4G:
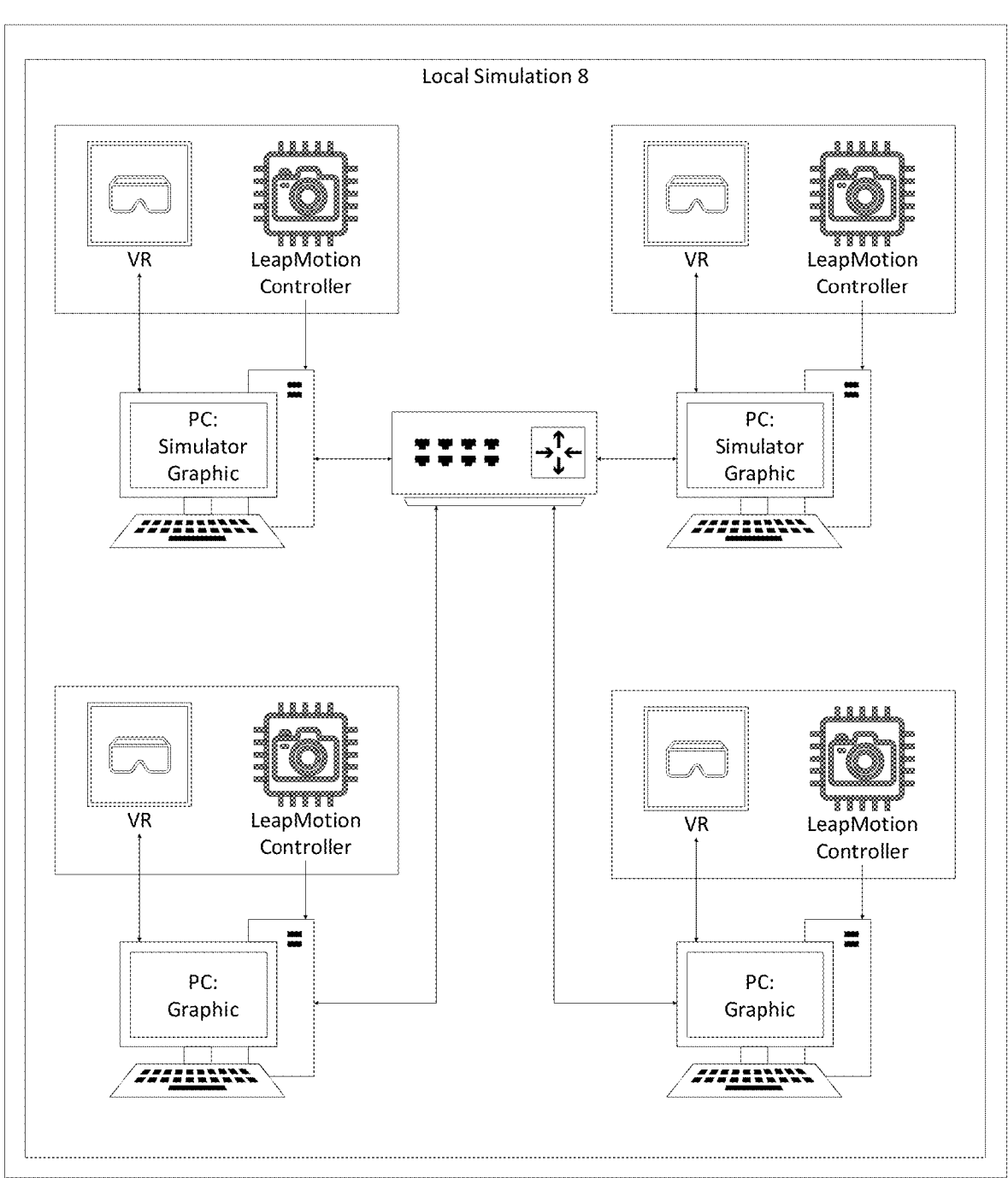
Figure 4H:
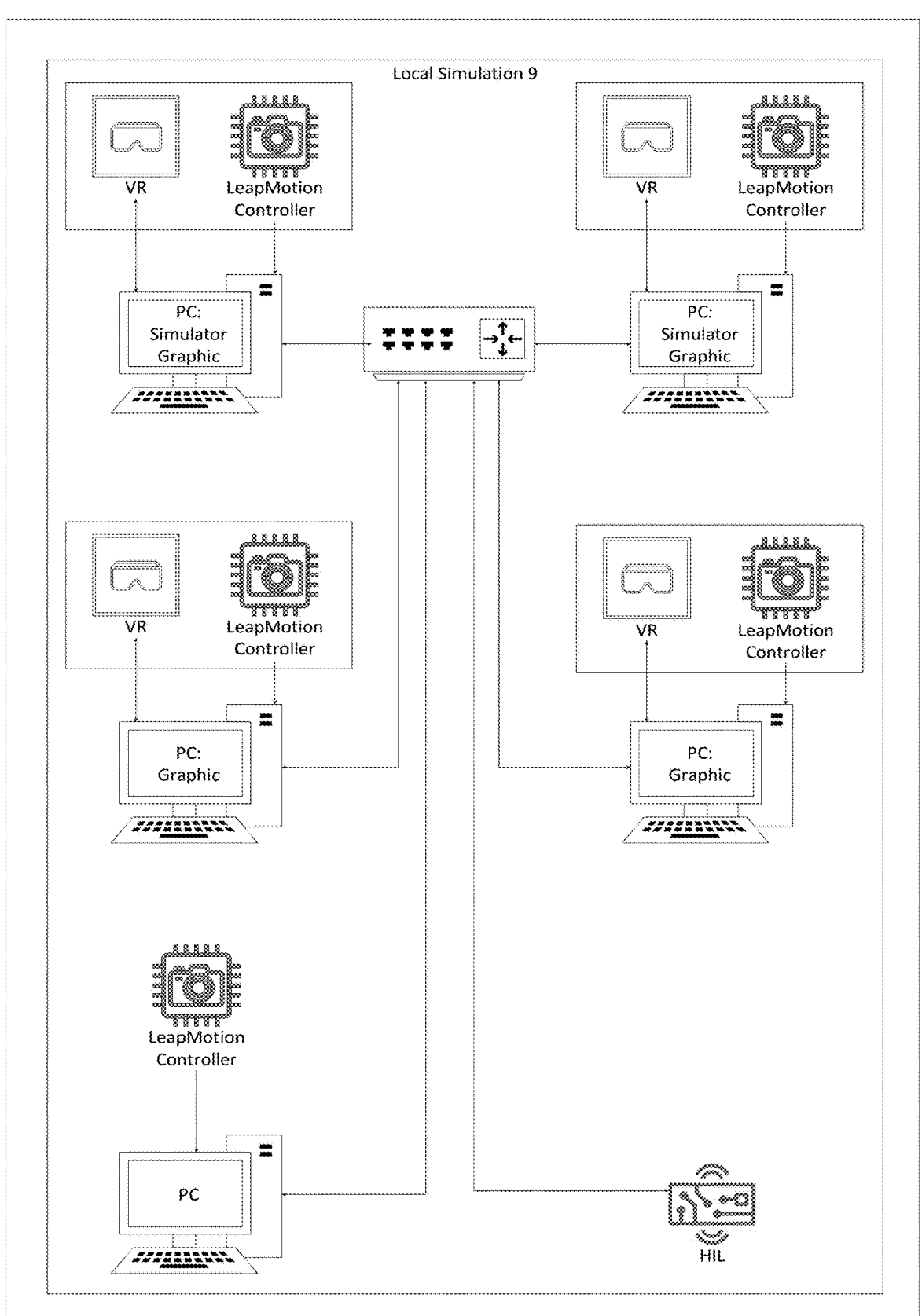

FIG. 3 represents the general hardware setup of a user. The "PC" is running the Overlay and without any other connection the "Simulator" is running on the same machine. The "User's Head" context container symbolized that the "LeapMotion Controller" hand tracking device is mounted or integrated to the "HMD". This "HMD" provides (head) tracking data to the Overlay engine and parallel provides the graphical output to the user.

FIGS. 4, 4A, 4B, 4C, 4D, 4E, 4F, 4G, and 4H symbolize various possible connections and setups of users, their machines and connections between each other to a "Local Simulation". Those connection possibilities are not exhaustive. The "Local Simulation" represents one single "Simulator" where all users act together for a single collective outcome. The network connection itself can be local or via the internet.

"HIL" means hardware-in-the-loop and symbolizes hardware that interacts with users and/or Simulators but are not necessarily user input controlled. "HIL" can also be connected to a PC and access the Network from there or directly interacts with the "Simulator" or Overlay engine.

Figure 5:
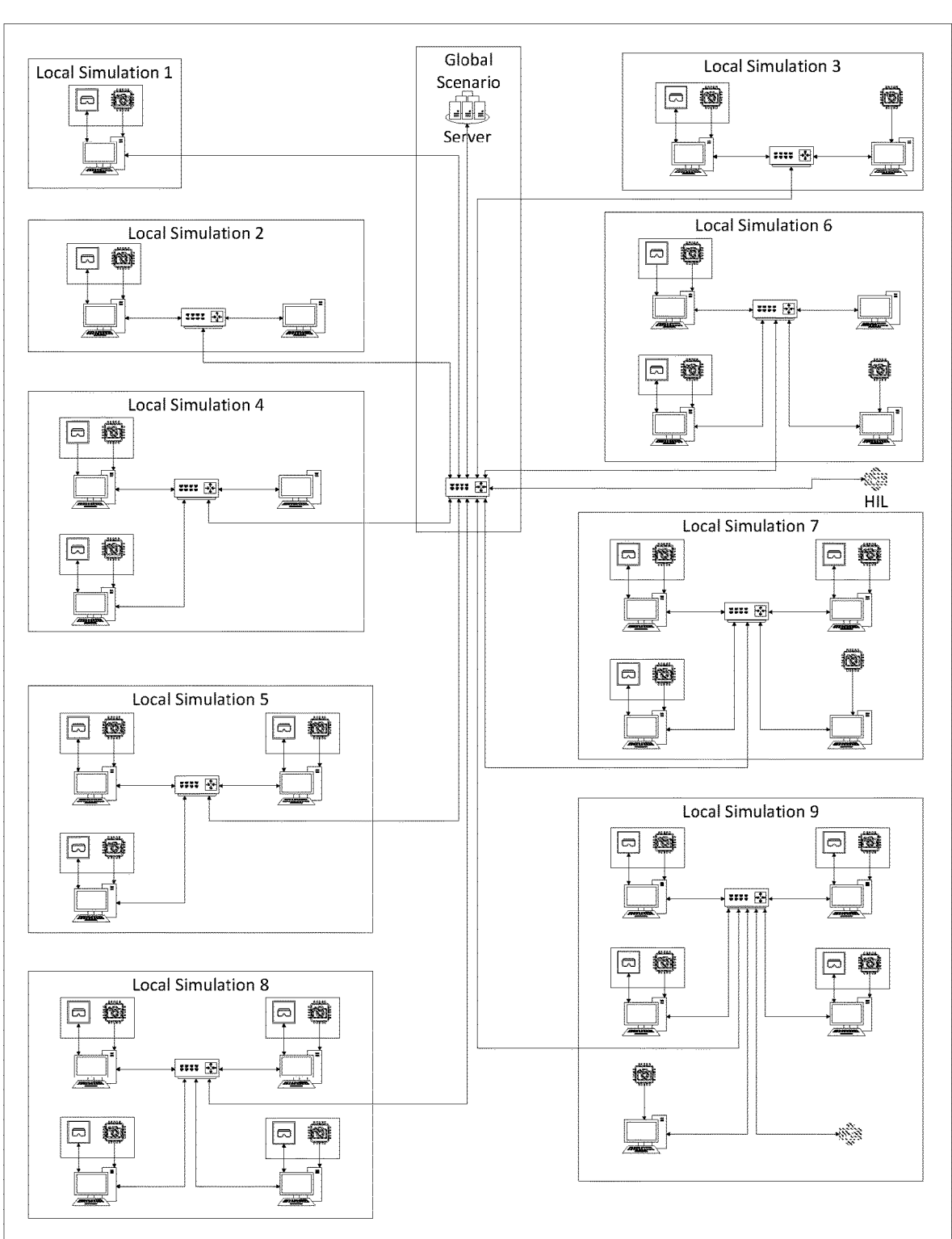
FIG. 5 shows the hardware setup of several local users in a network

FIG. 5 represents the possible "Local Simulation" and "HIL" setups acting a global scenario via a network connection. This network connection can be local or via the internet. The "Server" receives the required data from every "Local Simulation" without "seeing or knowing" how the "Local Simulations" got to their state (individual user inputs are irrelevant to the server). The "Server" feeds back to state of each "Local Simulation" or "HIL" as required.

Figure 6:
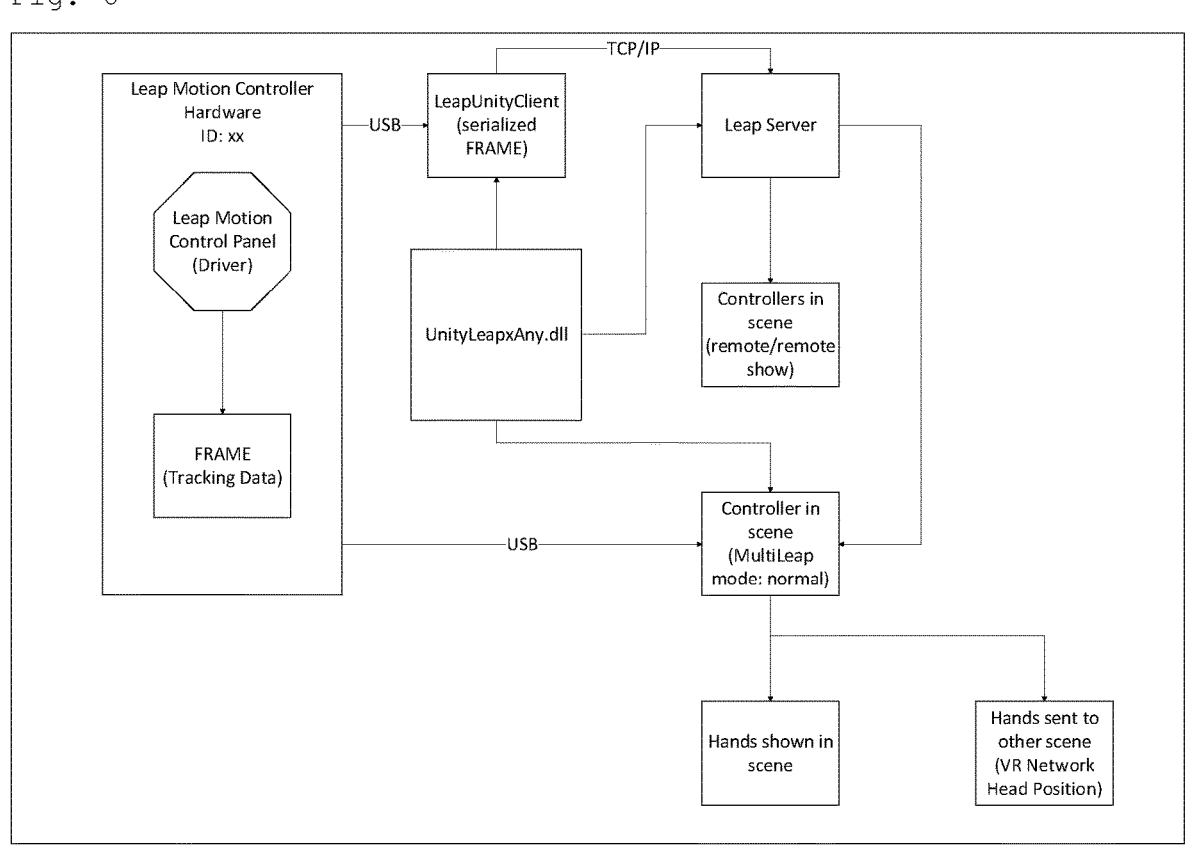
FIG. 6 shows how the tracking data is accessed or fed to the overlay

FIG. 6 represents how the tracking data is accessed or fed to the overlay. The "LeapMotion Control Panel (Driver)" is the native driver provided by the LeapMotion manufacture and is installed to the user's PC or another machine. This driver provides native "FRAMES (Tracking Data)" via an USB connection. If connected at another machine a "LeapUnityClient" is serializing those frames and provide them via network to the "LeapServer" to the overlay engine (described before). In this case the respective "LeapMontionHand Controller" Prefab/GameObject has to be set up in to "Remote" or "RemoteShow" mode.

If directly connected via USB the respective "LeapMontionHand Controller" Prefab/GameObject has to be set up in to "Normal" mode.

The "FRAMES" tracking data is then used within the Overlay engine to interact with "Interactables" or provided via network to other overlays.

The "FRAMES" tracking data can be prerecorded as well.

Figure 7:
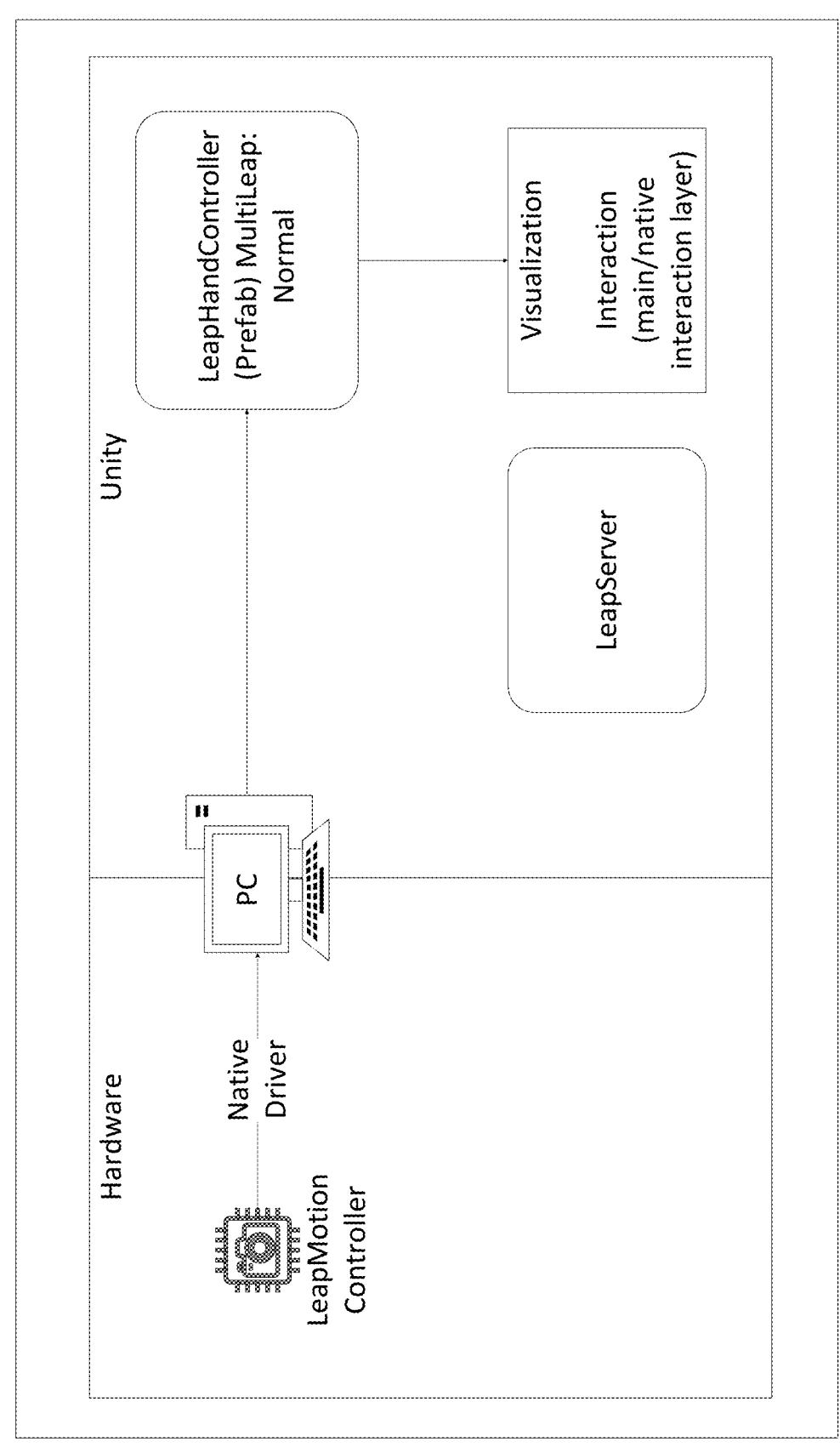
Figure 7A:
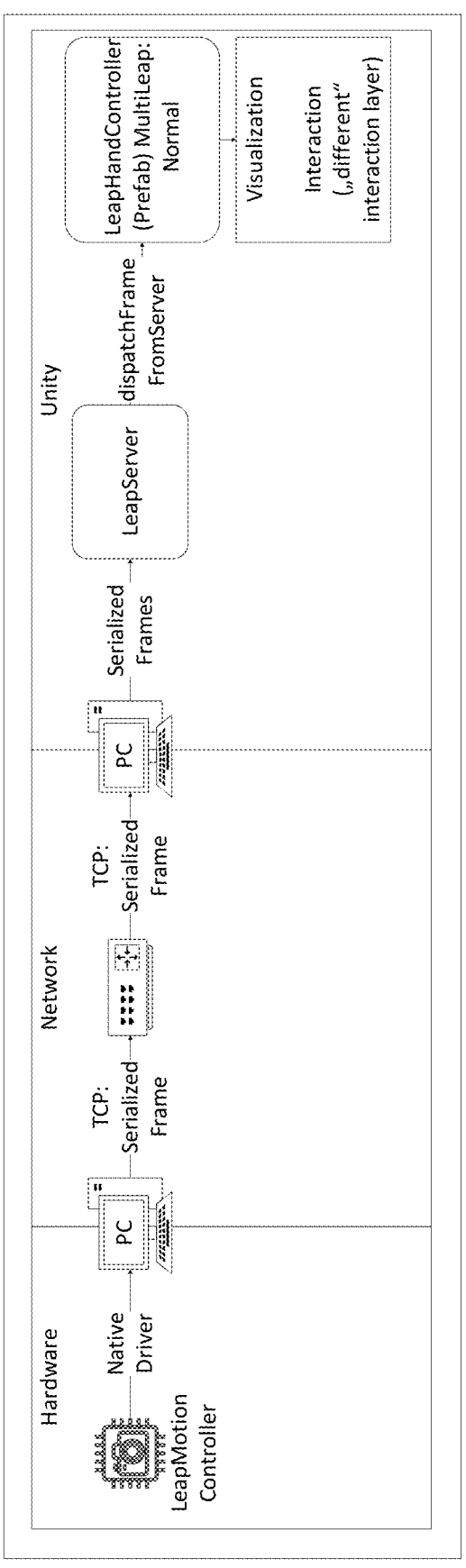
Figure 7B:
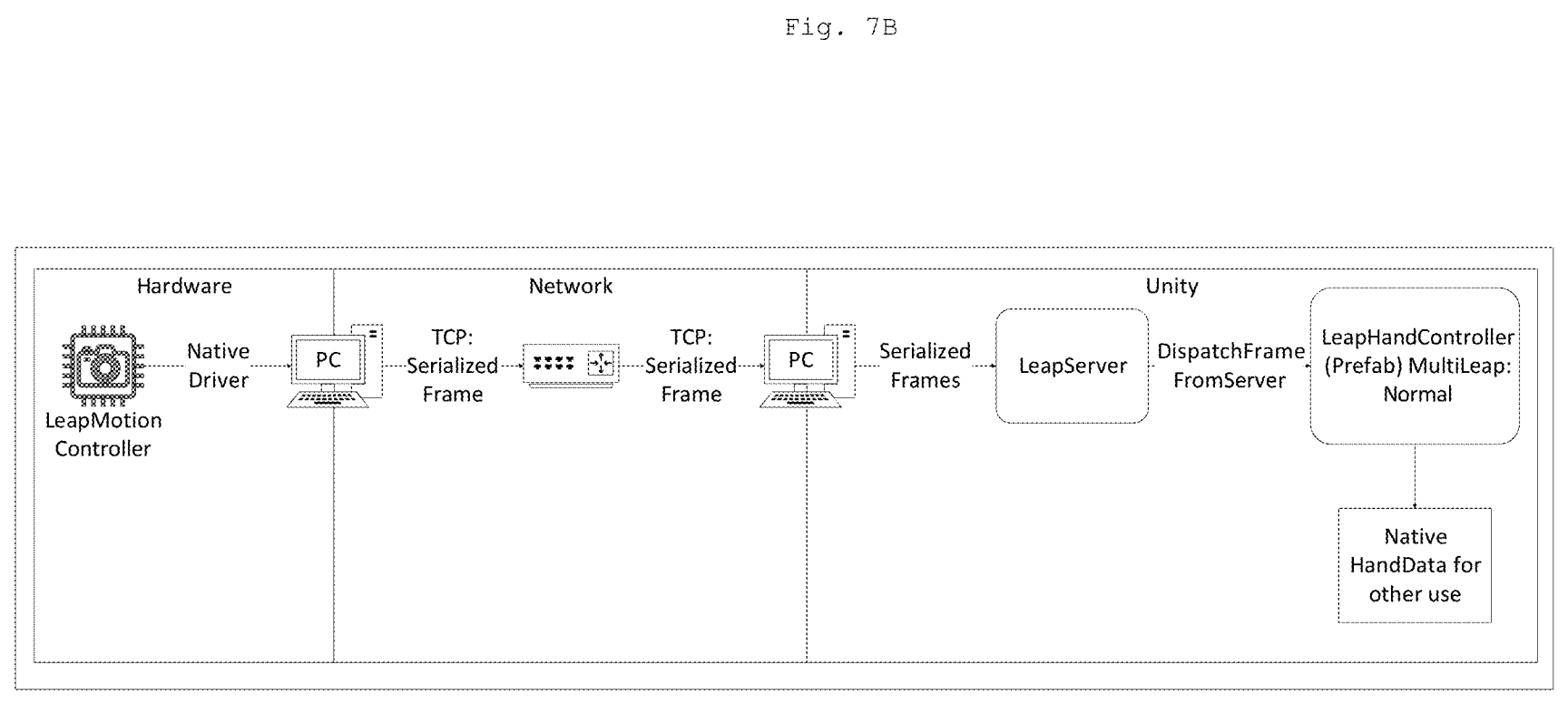

FIGS. 7, 7A, and 7B symbolize the different methods of getting the tracking data (FRAMES) to visualization on the overlay. Diagram 1 shows how the API/SDK was intended to use. The Unity engine is running on the "PC" and the "LeapMotion Controller" is directly connected to it. In the Unity the "LeapMotion Controller" is represented by the "LeapHandController" Prefab in "normal" mode. The "LeapServer" is bypassed. This is how the API/SDK provider intended to use it. The Unity engine shares the hardware with the "LeapMotion" driver.

The next two diagrams showing the "LeapMotion Controller" connected to a different machine (can be virtual or physical) compared to the machine the overlay engine is running on. The "FRAMES" are shared via a network connection. In those cases, the tracking data is handled by the "LeapServer" and distributed to the assigned "LeapHandController", then operating in "Remote" or "RemoteShow" mode.

Figure 8:
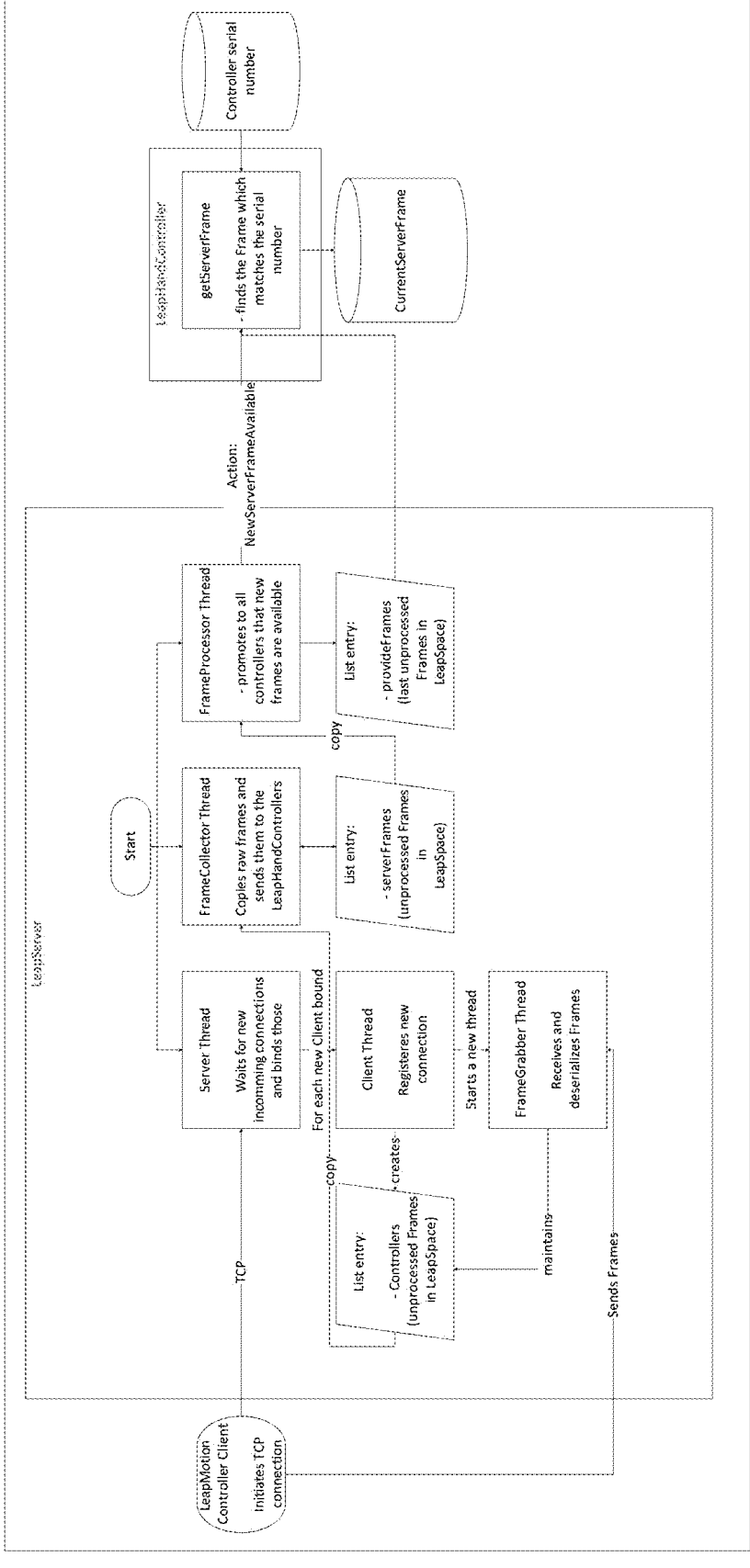
FIG. 8 shows the configuration of the LeapServer and LeapHandController and their working order.

FIG. 8 shows the initialization and work order of the "LeapServer" GameObject. During overlay engine start there are three threads initialized. The "Server Thread" handles incoming network connections from multiple machines where "FRAMES" are provided from. It keeps track of the connected devices and handles interruptions, disconnections and reconnections without stopping the "LeapServer" within the overlay engine. The connected "LeapMotion Controllers" and the respective data of those are stored in a list named "Controllers". Each connected "LeapMotion Controllers" initiates a new thread "Client Thread" which just handles the connection. The "Client Thread" initiates another thread called "FrameGrabber Thread". The "FrameGrabber Thread" handles the reception of "FRAMES" and updates the list entry. The "FrameGrabber Thread" activity is constantly checked by the "Client Thread". If the overlay engine shuts down or a disconnection, reconnection or disruptions occurs the "Client Thread" handles the errors of the "FrameGrabber Thread".

The "FrameCollector Thread" is started during initialization as well. It copies the entries from the entries from the "Controllers" list into the "serverFrames" list.

The "FrameProcessor Thread" is started during initialization as well. It copies the entries from the entries from the "serverFrames" into the "provideFrames" list. When it is copied an update "Action" is sent to the listeners ("LeapHandControllers" in "Remote" or "RemoteShow" mode) from where the respective frames are processed in the particular (identified by the "Controller serial number") Prefab.

During writing or copying of entries and/or lists mutexes are used in order to avoid data corruption. A mutex blocks a resource until the process/thread releases the mutex. If a mutex is taken/blocked this particular action by the thread or function is skipped. And tried again when new tracking data "FRAMES" are available. Since each "FRAME" contains the previous 60 "FRAMES" within itself the "LeapHandController" can still analyze the tracking data properly. Single "FRAME" omissions are interpolated with the driver's capability provided by the API/SDK.

Figure 9:
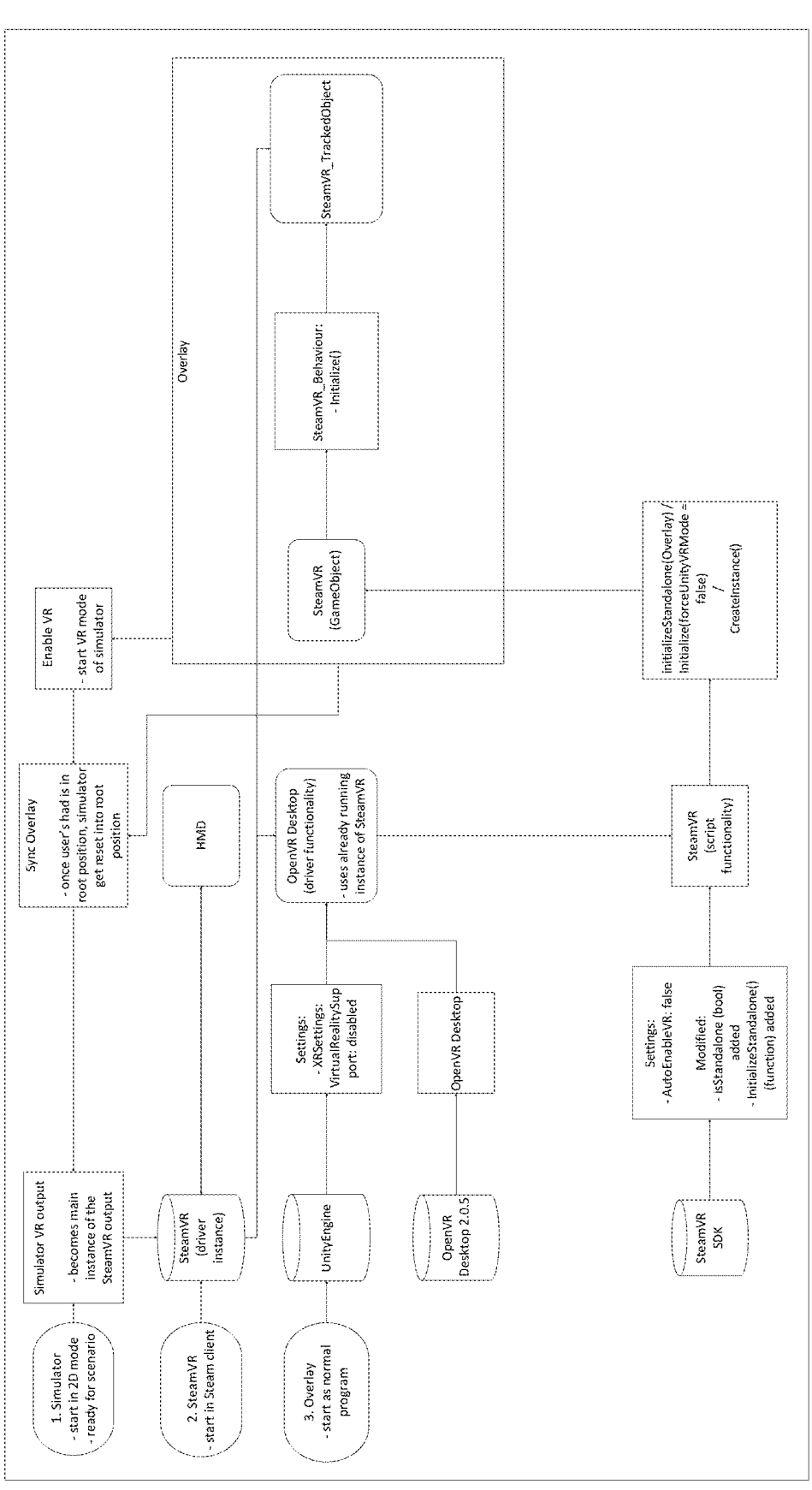
FIG. 9 explains in which order the "Simulator", "SteamVR" and the "overlay" engine shall be started in order to retrieve the instances of the "SteamVR" driver.

FIG. 9 explains in which order the "Simulator", "SteamVR" and the "overlay" engine shall be started in order to retrieve the instances of the "SteamVR" driver.

The "Simulator" is initially started in 2D mode only and provides the Simulation data "DataRefs".

Next "SteamVR" is started. It is important that the "Simulator" does not provide this instance of the "SteamVR" driver in order to avoid instance control issues. "SteamVR" will provide an idle space and output to the HMD and tracks its position.

Lastly the overlay is started. The "UnityEngine" itself is forced to be in 2D mode (via the XRSettings). The SDK package of "OpenVR Desktop" is used to initiate a standalone instance of "SteamVR" within the overlay engine/ Unity. It will use the previously started and initialized "SteamVR" driver instance on the machine. This means if there is no running "SteamVR" instance or when it gets closed the overlay engine stops. It is important to note that the "SteamVR" unity API/SDK starts a new instance of the "SteamVR" driver, hence closes the previous instance. This is undesirable. To prevent this behavior the "AutoEnableVR" setting in the API/SDK has to be set to "false".

With this setup and precautions the functions of the API/SDK are available in 2D mode and a "SteamVR" GameObject can be initialized (as standalone) within the overlay engine. Since it is dependent on the existing "SteamVR" driver instance it the overlay acts as overlay and does not cover the output produced by the running driver instance but adds to it.

From this GameObject the HMD data (tracking) is available to the overlay engine.

Later the Simulator is activated its native VR mode. The already running "SteamVR" driver instance handles the incoming VR request and enables VR output without changing the running instance. Hence the overlay engine overlays its output over the "Simulators" VR output.

Figure 10:
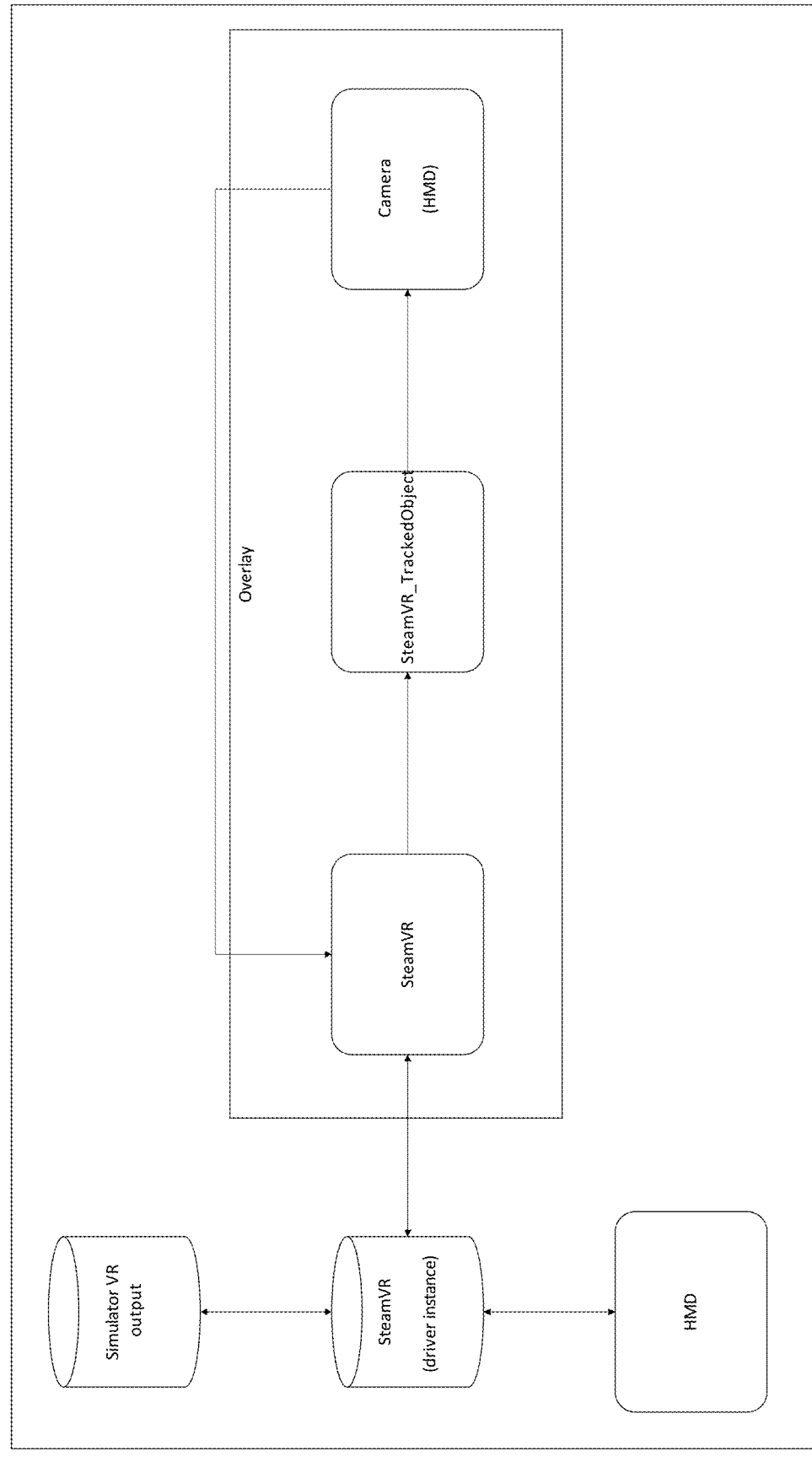
FIG. 10 shows how the tracking data is used to track the HMD position in Unity space.

Once setup and all initializations are completed FIG. 10 shows how the tracking data is used to track the HMD position in Unity space. There is a "Camera" GameObject attached to the "HMD" (in the overlay engine) This "Camera" captures the tracked hands and any other visible object (media player and content) in the overlay. This visible output is then fed to the "SteamVR" GameObject and gets added to the HMDs output of the "SteamVR" driver instance.

Figure 11:
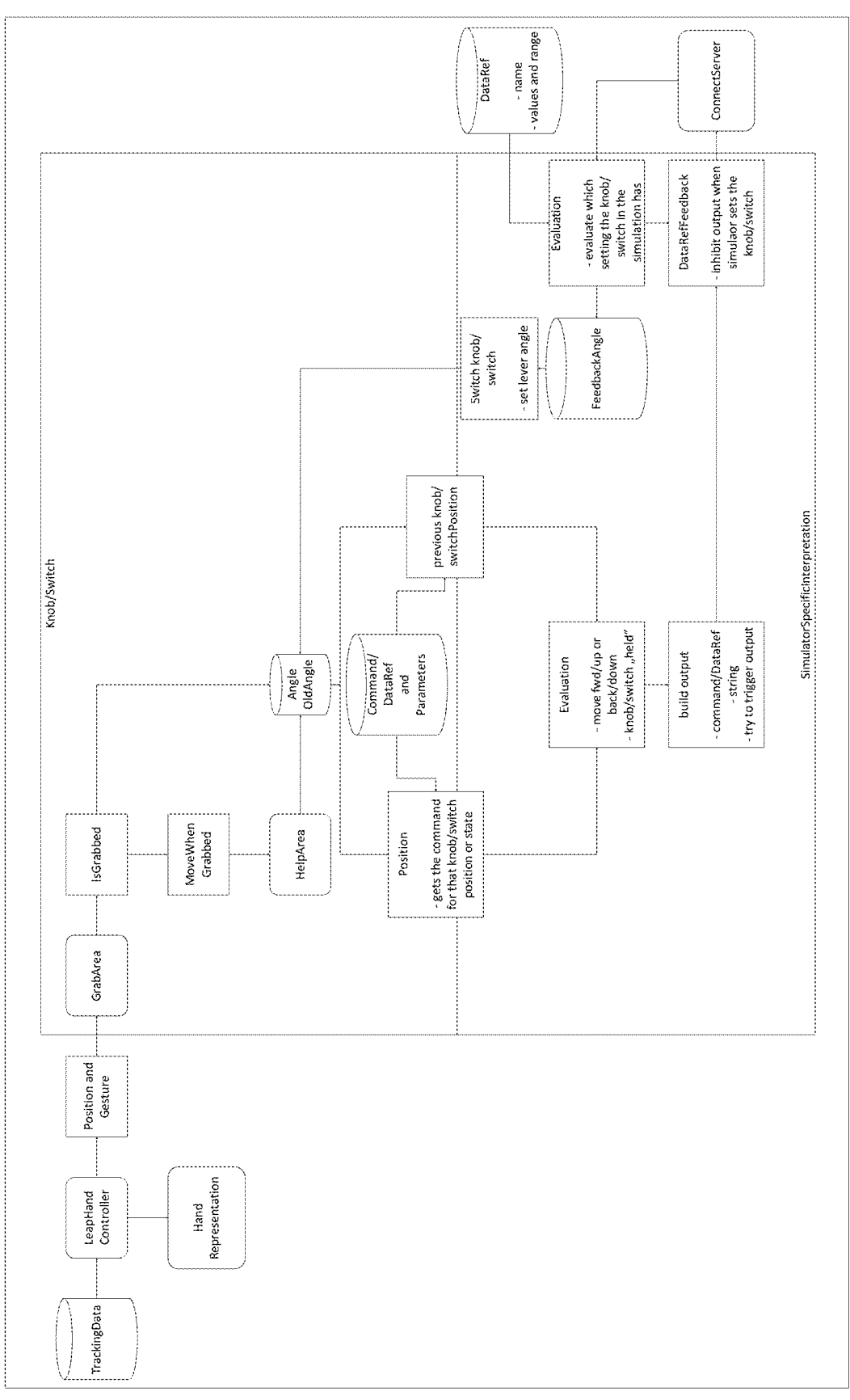
FIG. 11 symbolizes how the tracking date (hands) produce inputs via so called "Interactables" to the "Simulator"

This FIG. 11 symbolizes how the tracking data (hands) produce inputs via so called "Interactables" to the "Simulator". The tracking data ("FRAMES") are processed by its appropriate "LeapHandController". The resulting hands are displayed in the overlay and analyzed for positions and gestures. If the requirements (grabbing and distance) to interact with an "Interactable" are sensed the hand is interacting with the "GrabArea" of the "Interactable" and places it to a different position. This causes the "HelpArea" to move accordingly. Depending on the "Interactable's" setup it triggers an output right away or when the user releases the "GrabArea". According the new position "Angle" an output string of the "Command" or "DataRef" (according to the "Simulator's" API/SDK) is generated and sent to the "ConnectServer".

The "Interactable" can be set according the state or the output of the "Simulator". When the "ConnectServer" receives a new "DataRef" update or feedback the "Interactable" evaluates the corresponding position ("FeedbackAngle"). If the "HelpArea's" "Angle" differs from the "FeedbackAngle" and no hand is interacting with the "Interactable" ("isGrabbed" is "false") the "Angle" of the "Interactable" is changed to the "FeedbackAngle". A check routine inhibits the trigger of "Commands" or "DataRefs" when the "Interactable" is adjusted to match the "Simulator" state.

Figure 12A:
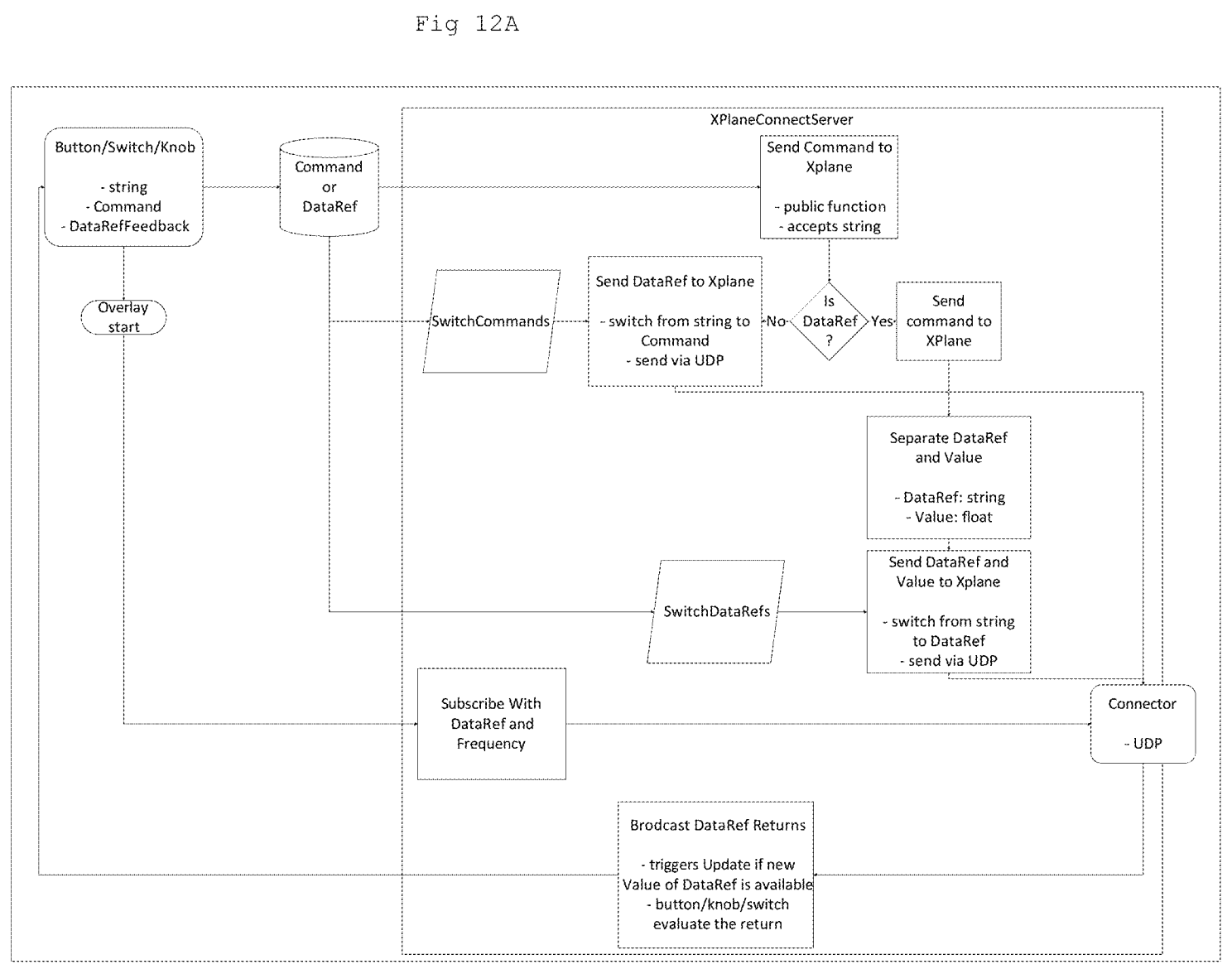

FIG. 12A symbolizes how the "ConnectServer" functions if the API/SDK requires a network connection (UDP for XPlane or TCP for others). The "Interactable" generates a "Command", "DataRef" or requires a "DataRefFeedback" from the "Simulator". The processing within the overlay engine is done with strings. The "Command" or "DataRef" string is sent via the public "SendCommandTo" function from the "Interactable" to the "ConnectServer". The "ConnectServer" identifies if it is a "Command" or a "DataRef". If it is a "DataRef" it separates the string into the "DataRef" itself and the "Value" to be set. A lookup switch-case table which converts the string into an actual "DataRef" from the API/SDK. A UDP "Connector" function then sends the "Command" or "DataRef" to the "Simulator". Similarly, the "Command" string is converted by a switch-case lookup table to the "Command" as per API/SDK.

If the "Connector" receives an update to a subscribed "DataRef" it will convert it to a string and broadcast the update into the overlay engine. The update is received by the "Interactables". If the "DataRef" matches the "DataRefFeedback" of the "Interactable" it updates it. Subscription to a DataRef is initiated on overlay start.

Figure 12B:
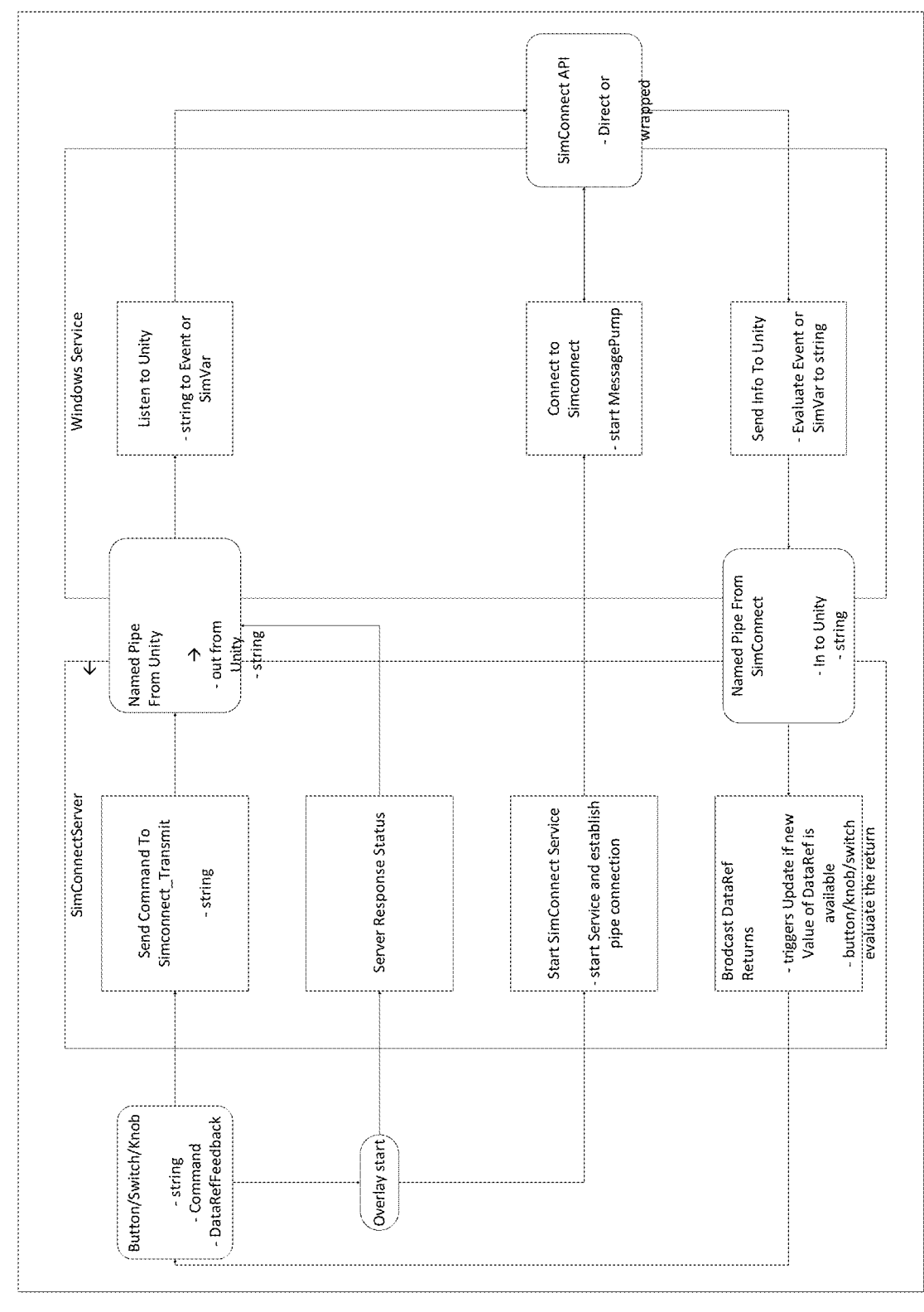

FIG. 12B symbolizes the function of the "ConnectServer" when the API/SDK of the "Simulator" is incompatible to the Unity engine (Microsoft Flight Simulator X for example). On the user's machine/PC is a "Windows Service" installed. This "Windows Service" is started and shut down via the "ConnectServer" on overlay start up and shut down. There are at least two "Named Pipes" (directional data pipe lines) enabled between the "ConnectServer" and "Windows Service". One pipe sends strings from the "Connect Server" within overlay to the "Windows Service" and the other one from the "Windows Service" to the "ConnectServer" within the overlay.

When an "Interactable" sends a "Command", "SimVar" or "Event" to the "ConnectServer" via the public accessible function "SendCommandTo" it will be transmitted to the "Windows Service" via the "Named Pipe". The "Windows Service" utilizes the API/SDK (natively written or via a wrapper) to send the required "Commands", "SimVar" or "Events" to the "Simulator".

Vice versa if the "Simulator" updates a monitored "Sim-Var" or triggers a monitored "Event" the "Windows Service" converts it to a string and sends it via the other "Named Pipe" to the "ConnectServer" within the overlay engine. This String is broadcasted into the overlay engine. The update is received by the "Interactables". If the "DataRef" or "SimVar" matches the "DataRefFeedback" of the "Inter-actable" it updates it. Subscription to a DataRef is initiated on overlay start.

Figure 12C:
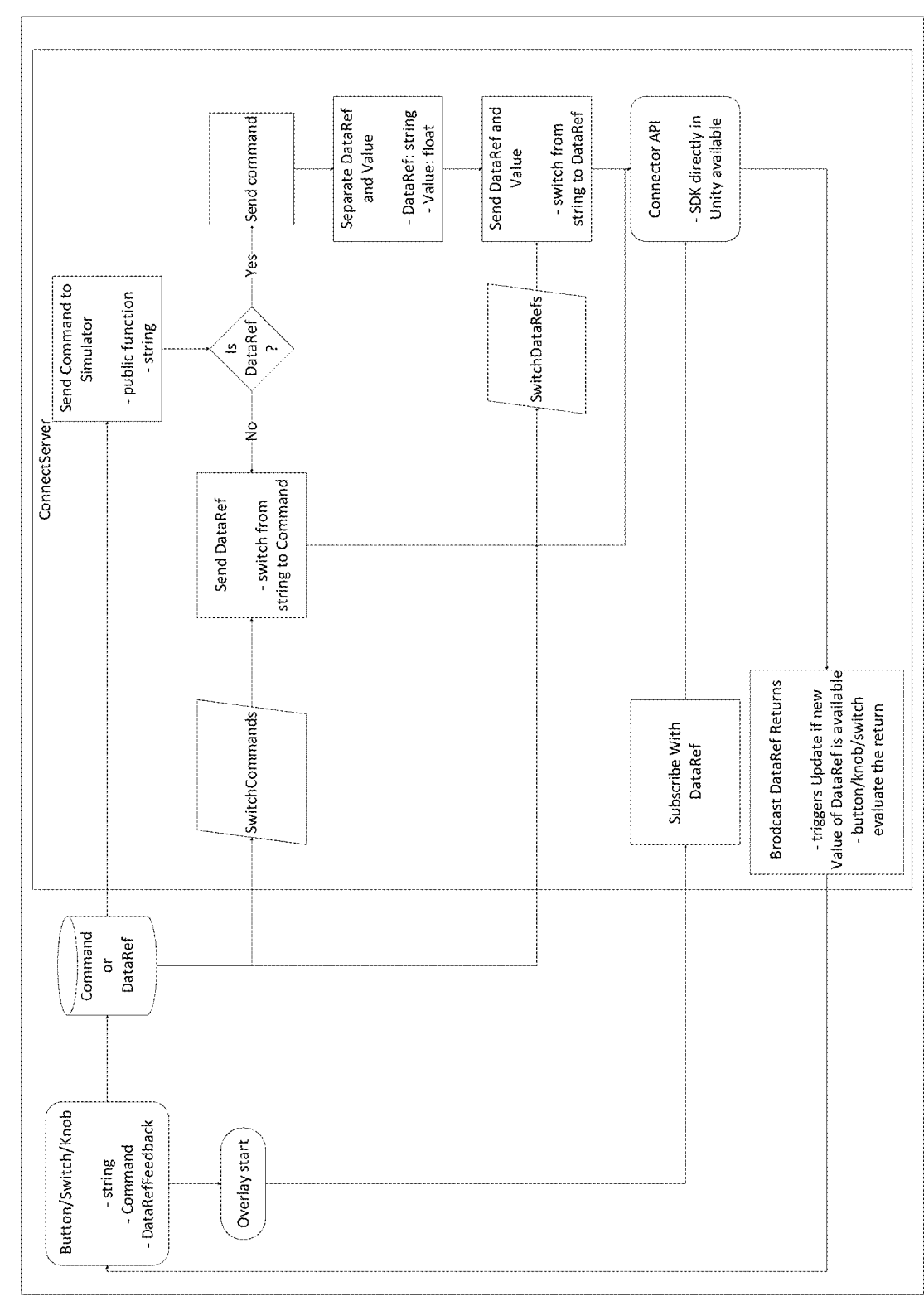

FIG. 12C symbolizes how the "ConnectServer" functions if the API/SDK is directly implemented into Unity (Mi-crosoftFlightSimulator for example). The "Interactable" generates a "Command", "DataRef" or requires a "DataR-efFeedback" from the "Simulator". The processing within the overlay engine is done with strings. The "Command" or "DataRef" string is sent via the public "SendCommandTo" function from the "Interactable" to the "ConnectServer". The "ConnectServer" identifies if it is a "Command" or a "DataRef". If it is a "DataRef" it separates the string into the "DataRef" itself and the "Value" to be set. A lookup switch-case table which converts the string into an actual "DataRef" from the API/SDK. A directly implemented "Connector" function then sends the "Command" or "DataRef" to the "Simulator". Similarly, the "Command" string is converted by a switch-case lookup table to the "Command" as per API/SDK. Depending on the "Simulator" utilized "Event" can be seen as "Command" and "SimVar" as "DataRef".

If the "Connector" receives an update to a subscribed "DataRef" it will convert it to a string and broadcast the update into the Overlay engine. The update is received by the "Interactables".

If the "DataRef" matches the "DataRefFeedback" of the "Interactable" it updates it. Subscription to a DataRef is initiated on Overlay start.

The invention claimed is:

1. Method providing interactive simulation comprising; a first computer displaying a first simulation interacting with a first user, the first computer is connected to a first head mounted display (HMD), and a first interactive control; a second computer displaying a second simulation interacting with a second user, the second computer is connected to a second HMD and a second interactive control, wherein the first computer is connected to the second computer via a network, and wherein both the first and second simulations are not designed to interact by providing the behaviours or even the movements of the different users characterized by:

a first overlay program running on the first computer and second overlay program running on the second com-puter, wherein the first overly program utilizes a first overlay engine that writes graphic information into a graphic card memory of the first computer displayed in the first HMD, to at least partially overlay graphic information of the first simulation, and the overly program utilizes a second overlay engine that writes graphic information into a graphic card memory of the second computer displayed in the second HMD to at least partially overlay graphic information of the sec-ond simulation without any other connection of the second overlay to the second simulation;

a first network-enabled communication module that facilitates the exchange of simulation state information, user control inputs, and overlay rendering data between simulation software and overlay systems via standard-ized interfaces and protocols running on the first com-puter and a second such module running on the second computer, the first network-enabled communication module communicating with the first simulation, via application programming interfaces (APIs) or standard interfaces, for receiving and/or setting status informa-tion of the first simulation, the first network-enabled communication module further communicating with the first overlay program to provide first overlay infor-mation;

a second networked-enabled communication module communicating with the second simulation, via APIs or standard interfaces, for receiving and/or setting status information of the second simulation, the second net-work-enabled communication module further commu-nicating with the second overlay program to provide second overlay information;

wherein the first and second network-enabled communi-cation modules communicate with each other over the network to exchange status information and to generate graphic information representing the other user in the simulations, displaying the respective user and their operation as an overlay over the simulation on the corresponding HMD; and wherein a number of computers, simulations, and HMDs is at least two, all of which communicating with each other and exchanging overlay information and simula-tion status information, to generate a common interac-tive simulation experience.

2. The method according to claim 1 wherein the first and second overlay engines generate a partially transparent overlay, which only covers depending on a head position determined by the HMD of the user parts of the graphical output in the HMD of the simulation to integrate the other user and his operations with respect to the interactive control in the simulation.

3. The method according to claim 2 wherein the first and second overly programs implement the first and second overlay engines using a game engine and uses a driver of the game engine for rendering the overlay on top of the output of the simulation, and wherein the first and second network-enabled communication modules that facilitate the exchange of simulation status information, user control inputs, and overlay rendering data between simulation software and overlay systems via standardized interfaces and protocols is implemented as part of the game engine for interaction of the overlay program with the simulations in accordance with user inputs of the interactive controls, standardized software development kits (SDKs) and application programming interfaces (APIs) are used for analyzing and transmitting user gesture or interaction data.

4. The method according to claim 1 wherein a media player provides additional information to the first and sec-ond overlay programs via the first and second overlay engines being displayed in the HMD, providing instructions and information to the user, wherein the additional information is imported from third party content to the first and second overlay programs provided at runtime to control the simulation or to display information and wherein the media player reacts to user inputs and simulator outputs.

5. The method according to claim 1 wherein the first and second overly programs via the first and second overlay engines renders virtual hands reflecting the hand movements and gestures of the users for operation of the interactive controls; and wherein the hand movements and gestures interact with defined inputs of the first and second overlay programs; the hand movements and gestures being obtained from a software development kit (SDK) for analyzing and transmitting user hand-gesture data in a consistent format, with the capability to integrate and convert non-standard tracking input into the SDK-defined format for use by the first and second overlay programs.

6. The method according to claim 1, wherein the first and second overly programs via the first and second overlay engines uses environment information from the simulation so that no portion of a rendered hand is displayed when the rendered hand is located behind obstacles in the simulation.

7. The method according to claim 1 wherein the first and second simulations are identical and one of simulations runs on one computer and displayed on the first and the second computers; or wherein the first simulation and the second simulation run separately on the first and second computers respectively, and information is exchanged between the simulations.

8. The method according to claim 1 wherein the simulations use different technologies or implementations or software but are able to interact via the first and second networked-enabled communication modules.

9. A system for providing interactive simulation comprising: a first computer displaying first simulation interacting with a first user, the first computer is connected to a first head mounted display (HMD), and a first interactive control; a second computer displaying a second simulation interacting with a second user, the second computer connected to a second HMD and a second interactive control; wherein the first computer is connected to the second computer via a network; and, wherein the system is configured to perform the method of claim 1.

\* \* \* \* \*